US011863697B2

(12) United States Patent
Nguyen Van et al.

(10) Patent No.: US 11,863,697 B2
(45) Date of Patent: Jan. 2, 2024

(54) ELECTRONIC DEVICE

(71) Applicant: SAMSUNG ELECTRONICS CO., LTD., Suwon-si (KR)

(72) Inventors: Hoang Nguyen Van, Ha Noi (VN); Tri Bui Dac, Ha Noi (VN); Tung Dong Manh, Thai Nguyen (VN); Quy Hoang Kim, Thai Nguyen (VN); Kyoungsun Lee, Suwon-si (KR); Thang Ngo Van, Thanh Hoa (VN); Chien Nguyen Quoc, Ha Nam (VN); Thanh Tran Quoc, Thai Nguyen (VN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 321 days.

(21) Appl. No.: 17/514,994

(22) Filed: Oct. 29, 2021

(65) Prior Publication Data
US 2022/0053076 A1 Feb. 17, 2022

Related U.S. Application Data

(63) Continuation of application No. PCT/KR2019/012954, filed on Oct. 2, 2019.

(51) Int. Cl.
*H04M 1/02* (2006.01)
*H04B 1/03* (2006.01)
(Continued)

(52) U.S. Cl.
CPC ............ *H04M 1/18* (2013.01); *G06F 1/1656* (2013.01); *G06F 1/1686* (2013.01); *H04M 1/0264* (2013.01); *G06F 2200/1633* (2013.01)

(58) Field of Classification Search
CPC ........ H04M 1/18; H04M 1/0264; H04M 1/02; H04M 1/03; H04B 1/03; H04B 1/08;
(Continued)

(56) References Cited

U.S. PATENT DOCUMENTS 10,203,587 B2   2/2019   Kim et al.
10,257,333 B2   4/2019   Kim et al.
(Continued)

FOREIGN PATENT DOCUMENTS

CN   107853823 A   3/2018
JP   2010-273213 A   12/2010
(Continued)

OTHER PUBLICATIONS

Communication dated Jul. 1, 2020, issued by the International Searching Authority in counterpart International Application No. PCT/KR2019/012954 (PCT/ISA/210).

*Primary Examiner* — Andrew Wendell
(74) *Attorney, Agent, or Firm* — Sughrue Mion, PLLC

(57) ABSTRACT

Provided is an electronic device including: a housing; a camera module oriented in a first direction inside the housing; a camera window arranged in front of the camera module in the first direction; a cover including an opening into which the camera window is insertable, the cover coupled to the housing; and a window frame supporting the camera window and mounted on the cover. The window frame includes: a frame body including a support portion arranged in the opening and supporting the camera window, and a mounting portion extending from the support portion in a second direction that is perpendicular to the first direction and overlapped by the cover in the first direction; a retention member retaining a first gap between the mounting portion and the cover in the first direction; and a waterproof body configured to be elastically deformed while arranged between the mounting portion and the cover.

20 Claims, 24 Drawing Sheets

(51) Int. Cl.
*H04B 1/08* (2006.01)
*H04M 1/18* (2006.01)
*G06F 1/16* (2006.01)

(58) Field of Classification Search
CPC ........... H04B 2001/3894; G06F 1/1656; G06F 1/1686; G06F 2200/1633
See application file for complete search history.

(56) References Cited

U.S. PATENT DOCUMENTS

| | | | |
|---|---|---|---|
| 10,405,446 B2 | 9/2019 | Choi et al. | |
| 10,484,582 B2 * | 11/2019 | Chen | H04M 1/0264 |
| 2012/0063077 A1 | 3/2012 | Tomobe et al. | |
| 2012/0293419 A1 * | 11/2012 | Kojima | H04M 1/23 345/169 |
| 2013/0050961 A1 * | 2/2013 | Kang | H04M 1/0274 361/749 |
| 2013/0314810 A1 * | 11/2013 | Sekimoto | G02B 7/023 359/823 |
| 2014/0293557 A1 * | 10/2014 | Iijima | H04M 1/18 361/752 |
| 2015/0077624 A1 * | 3/2015 | Havskjold | G01J 1/4204 250/206 |
| 2017/0099742 A1 * | 4/2017 | Choi | G06F 1/1637 |
| 2017/0351164 A1 * | 12/2017 | Kim | H04N 23/51 |
| 2018/0035204 A1 * | 2/2018 | Park | H04M 1/03 |
| 2018/0241861 A1 * | 8/2018 | Kim | G06F 1/1656 |
| 2019/0104818 A1 * | 4/2019 | Deng | A45C 11/00 |
| 2019/0173987 A1 * | 6/2019 | Sung | G02B 7/02 |
| 2020/0120193 A1 | 4/2020 | Ha et al. | |
| 2020/0264664 A1 * | 8/2020 | Mizoguchi | G06F 1/1656 |

FOREIGN PATENT DOCUMENTS

| | | |
|---|---|---|
| KR | 10-2016-0150543 A | 12/2016 |
| KR | 10-2017-0040082 A | 4/2017 |
| KR | 10-2018-0096178 A | 8/2018 |
| KR | 10-2018-0105502 A | 9/2018 |

* cited by examiner

ELECTRONIC DEVICE

CROSS-REFERENCE TO THE RELATED APPLICATION

This application is a bypass continuation application of International Patent Application No. PCT/KR2019/012954, filed Oct. 2, 2019, the entire contents of which are incorporated by reference.

TECHNICAL FIELD

Embodiments of the present disclosure relate to an electronic device.

BACKGROUND ART

With the recent development of digital technologies, various types of electronic devices such as mobile communication terminals, smartphones, tablet personal computers (PCs), personal digital assistants (PDAs), electronic notes, laptops, wearable devices, etc. The electronic devices have reached a mobile convergence stage covering functions of other devices. For example, the electronic devices are capable of providing a call function such as voice communication, video communication, etc., a message transmission/reception function such as short message service (SMS)/multimedia message service (MMS), an electronic mail (e-mail), etc., an electronic note function, a photographing function, a broadcasting play function, a video play function, a music play function, an Internet function, a messenger function, a social networking service (SNS) function, etc.

Moreover, an electronic device may be exposed to various environments. For example, the electronic device, while being used, may be exposed to water or moisture. In this regard, the electronic device may provide a waterproof function.

DESCRIPTION OF EMBODIMENTS

Technical Problem

According to various embodiments, there is provided an electronic device having an improved waterproof function.

Solution to Problem

According to one or more embodiments, an electronic device is provided. The electronic device includes: a housing; a camera module oriented in a first direction inside the housing; a camera window arranged in front of the camera module in the first direction; a cover including an opening into which the camera window is insertable, the cover coupled to the housing; and a window frame supporting the camera window and mounted on the cover, wherein the window frame includes: a frame body including a support portion arranged in the opening and supporting the camera window, and a mounting portion extending from the support portion in a second direction that is perpendicular to the first direction and overlapped by the cover in the first direction; a retention member, including at least one body, retaining a first gap between the mounting portion and the cover in the first direction; and a waterproof body configured to be elastically deformed while arranged between the mounting portion and the cover.

According to an embodiment, the at least one body of the retention member includes an adhesive body arranged between the mounting portion and the cover and adhering the mounting portion to the cover.

According to an embodiment, the waterproof body is softer than the adhesive body.

According to an embodiment, the retention member further includes an elastic body that is configured to provide an elastic force to the mounting portion to press the mounting portion to the cover, and the mounting portion includes a step into which a part of the elastic body is inserted.

According to an embodiment, the waterproof body includes a first portion arranged between the mounting portion and the cover, and a second portion extending from the first portion and arranged between the adhesive body and the mounting portion.

According to an embodiment, the elastic body extends from the second portion and includes a material that is the same as a material of the waterproof body.

According to an embodiment, there is a second gap between the support portion and the cover in the second direction, and the waterproof body is arranged such as to not to be exposed through the second gap to an outside of the electronic device.

According to an embodiment, the mounting portion includes a step into which a part of the waterproof body is inserted.

According to an embodiment, at least a part of the elastic body is overlapped by the waterproof body in the first direction.

According to an embodiment, a width of the elastic body is greater than a width of the waterproof body.

According to an embodiment, the waterproof body is arranged inside the adhesive body.

According to an embodiment, the electronic device further includes a display arranged in the housing.

According to one or more embodiments, an electronic device is provided. The electronic device includes: a housing; an electronic module oriented in a first direction inside the housing; a window arranged in front of the electronic module in the first direction; a cover including an opening into which the window is insertable, the cover coupled to the housing; and a window frame supporting the window and mounted on the cover, wherein the window frame includes: a frame body including a support portion arranged in the opening and supporting the window, and a mounting portion extending from the support portion in a second direction that is perpendicular to the first direction and overlapped by the cover in the first direction; an adhesive body arranged between the mounting portion and the cover and adhering the mounting portion to the cover; and a waterproof body configured to be elastically deformed while arranged between the mounting portion and the cover, the waterproof body being softer than the adhesive body.

According to an embodiment, the electronic device further includes an elastic body that is configured to provide an elastic force to the mounting portion to press the mounting portion to the cover.

According to an embodiment, the waterproof body includes a first portion arranged between the mounting portion and the cover, and a second portion extending from the first portion and arranged between the adhesive body and the mounting portion, and the elastic body extends from the second portion and includes a material that is the same as a material of the waterproof body.

According to an embodiment, there is a second gap between the support portion and the cover in the second direction, and the waterproof body is arranged such as to not to be exposed through the second gap to an outside of the electronic device.

According to an embodiment, the mounting portion includes a step into which a part of the waterproof body is inserted.

According to an embodiment, at least a part of the elastic body is overlapped by the waterproof body in the first direction.

According to an embodiment, a width of the elastic body is greater than a width of the waterproof body.

According to an embodiment, the waterproof body is arranged inside the adhesive body.

According to an embodiment, the mounting portion includes a step into which a part of the elastic body is inserted.

Advantageous Effects of Disclosure

An electronic device according to an embodiment may provide an improved waterproof function.

MODE OF DISCLOSURE

Figure 1A:
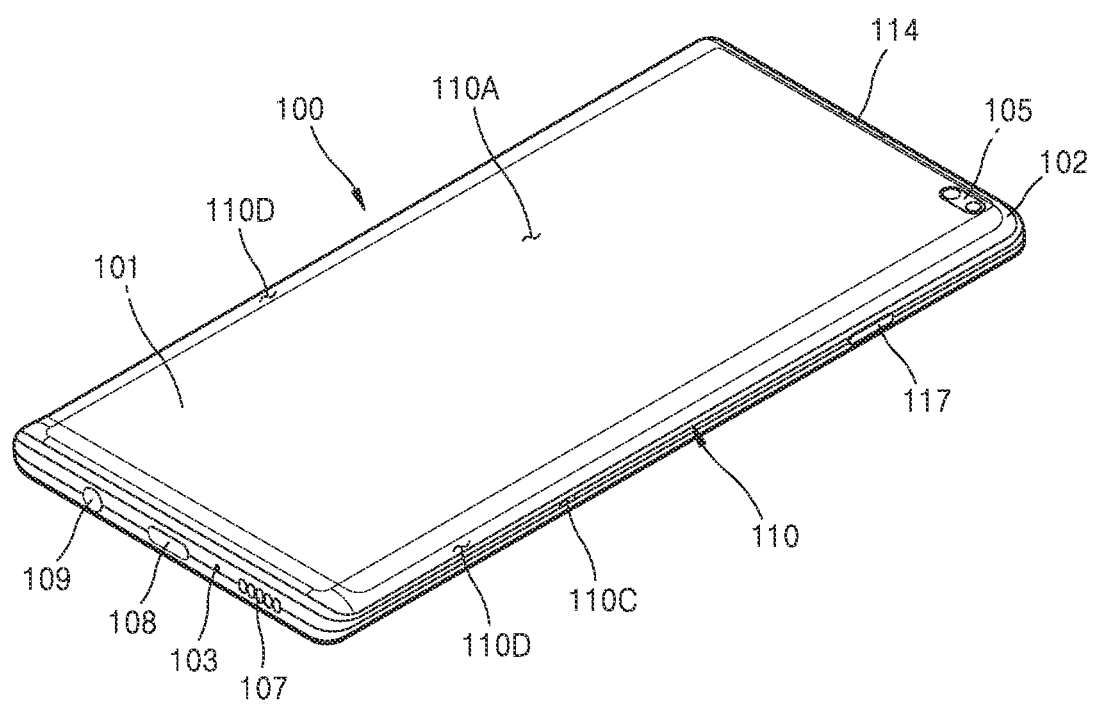
FIG. 1A is a perspective view of an electronic device, viewed at a first angle, according to an embodiment.

Hereinafter, structures and operations of non-limiting example embodiments of the present disclosure will be described in detail with reference to the accompanying drawings.

Terms used herein may be described in brief, and the disclosure will be described in detail.

Although terms used in the disclosure are selected based on general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms may be disclosed in a corresponding description part of the disclosure. Therefore, the terms used in the disclosure should be defined not by the simple names of the terms but by the meaning of the terms and the contents throughout the disclosure.

Throughout the entirety of the specification of the disclosure, when it is assumed that a certain part includes a certain component, the term 'including' means that a corresponding component may further include other components unless specially described to the contrary.

The terms "first", "second", etc., will be used to distinguish one component from another component, rather than for a restrictive meaning.

Hereinafter, non-limiting example embodiments of the present disclosure will be described in detail with reference to the attached drawings to allow those of ordinary skill in the art to easily carry out the embodiments of the disclosure. However, embodiments of the present disclosure may be implemented in various different forms, and are not limited to the example embodiments of the present disclosure described herein. To clearly describe embodiments of the present disclosure, parts that are not associated with the description have been omitted from the drawings, and throughout the specification, identical reference numerals refer to identical parts.

Figure 1B:
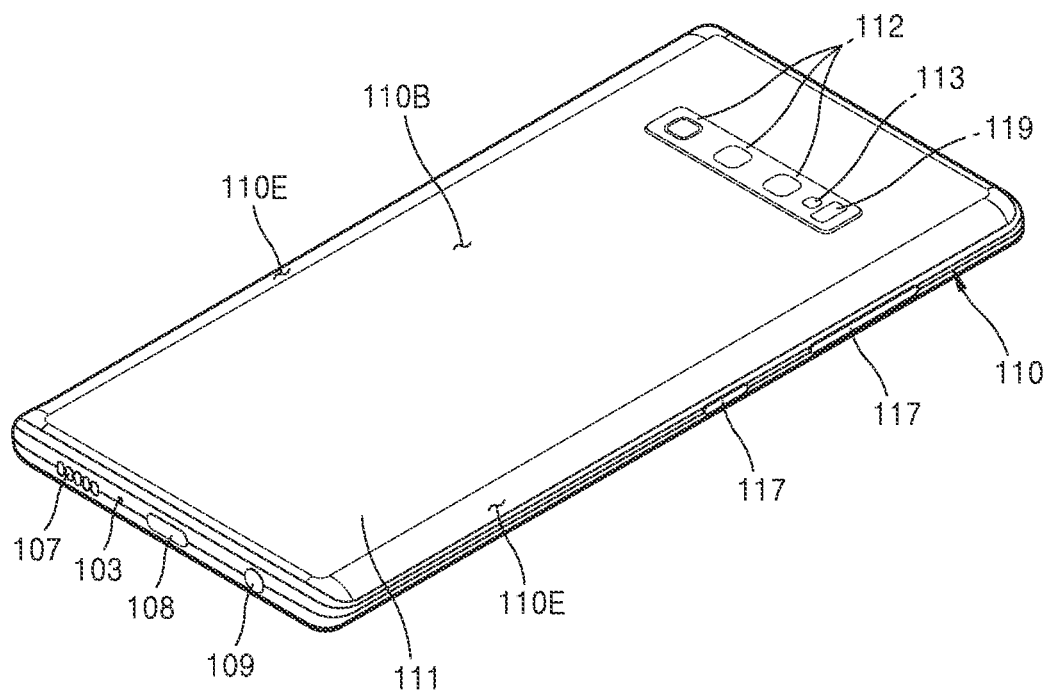
FIG. 1B is a perspective view of the electronic device, viewed at a second angle, according to an embodiment.
Figure 2:
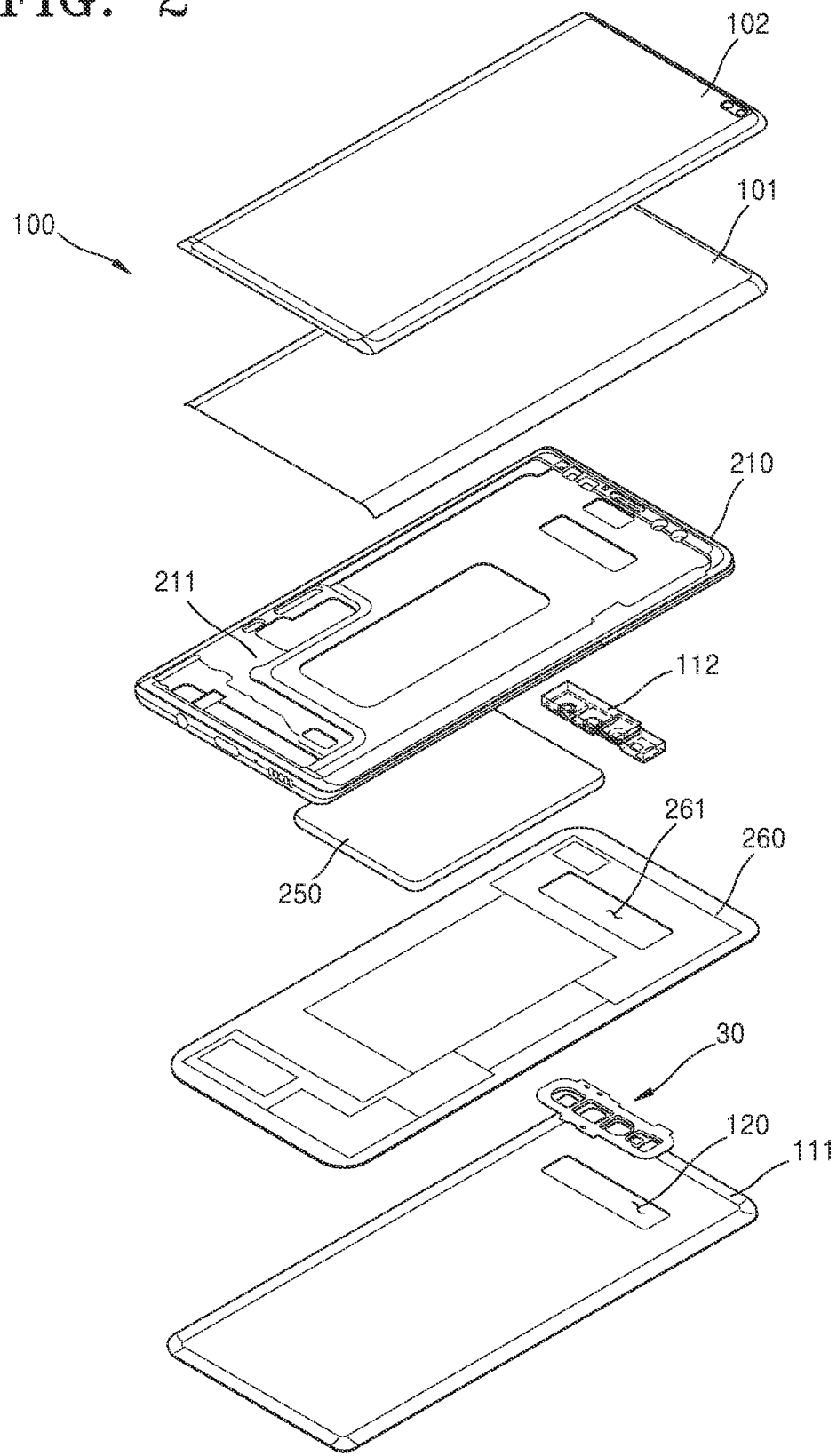
FIG. 2 is an exploded perspective view of an electronic device according to an embodiment.

FIGS. 1A and 1B are perspective views of an electronic device 100, viewed at different angles, according to an embodiment, and FIG. 2 is an exploded perspective view of the electronic device 100 according to an embodiment.

Referring to FIGS. 1A, 1B, and 2, the electronic device 100 according to an embodiment may include a housing 110 that includes a first surface (or a front surface) 110A, a second surface (or a rear surface) 110B, and a side surface 110C surrounding a space between the first surface 110A and the second surface 110B. In another embodiment (not shown), the housing 110 may refer to a structure that forms a part of the first surface 110A, the second surface 110B, and the side surfaces 110C of FIG. 1.

According to an embodiment, the first surface 110A may be formed by a front plate 102, at least a part of which is substantially transparent (e.g., a glass plate including various coating layers, or a polymer plate).

The second surface 110B may be formed by a rear cover 111 (or a cover) that is substantially opaque. The rear cover 111 may be formed by, for example, coated or painted glass, ceramic, polymer, metal (e.g., aluminum, stainless steel (STS), or magnesium) or a combination of at least two of the listed materials.

For example, the rear cover 111 may include ceramic. The ceramic may be stronger against shock than glass, and may be more anti-magnetic than metal. The rear cover 111 may be useful for an electronic device having a 5th-generation (5G) wireless system module mounted thereon. When a ceramic material is used as a material for the rear cover 111, more nonmetal areas may be obtained, which may be beneficial for 5G signal transmission and a high sagging area may be easy to implement to provide a wide range for broad transmission/reception of a 5G wireless system module.

The side surface 110C may be coupled with the front plate 102 and the rear cover 111, and may be formed by a side bezel structure (or a "side member") including metal and/or polymer. In an embodiment, the rear cover 111 and the side bezel structure may be formed as one piece and may include the same material (e.g., a metal material such as aluminum).

In the illustrated embodiment, the front plate 102 may include two first regions 110D that are bent from the first surface 110A to the rear cover 111 to seamlessly extend, in opposite long edge ends of the front plate 102. In the illustrated embodiment (see FIG. 1B), the rear cover 111 may include two second regions 110E that are bent from the second surface 110B to the front plate 102 to seamlessly extend, at opposite long edge ends of the electronic device 100. In an embodiment, the front plate 102 (or the rear cover 111) may include one of the first regions 110D (or the second regions 110E). In another embodiment, some of the first regions 110D or the second regions 110E may not be included. In the foregoing embodiments, when viewed from a side surface of the electronic device 100, the side bezel structure may have a first thickness (or width) in a side surface part not including the first regions 110D or the second regions 110E and have a second thickness that is less than the first thickness in a side surface part including the first regions 110D or the second regions 110E.

According to an embodiments, the electronic device 100 may include at least one or more of a display 101, audio modules, a sensor module 119, camera modules, a key input device 117, a light-emitting element, and connector holes. In an embodiment, the electronic device 100 may exclude at least one (e.g., the key input device 117 or the light-emitting element) of the components or further include other components. The audio modules, the sensor module 119, and the camera modules may be referred to as electronic modules.

The display 101 may be exposed through the most part of, for example, the front plate 102. In an embodiment, at least a part of the display 101 may be exposed through the first surface 110A and the front plate 102 that forms the first regions 110D of the side surfaces 110C. In an embodiment, a corner of the display 101 may be formed substantially identically to an adjacent peripheral shape of the front plate 102. In another embodiment (not shown), to extend an area by which the display 101 is exposed, a gap between a periphery of the display 101 and a periphery of the front plate 102 may be substantially identically formed.

In an embodiment, a recess or an opening may be formed in a part of a screen display region of the display 101, and at least one of the audio modules, the sensor module 119, or the light-emitting element aligned with the recess or the opening may be included. In another embodiment (not shown), on a back surface of the screen display region of the display 101, at least one of the audio module, the sensor module 119, the first camera module 105, a fingerprint sensor, or the light-emitting element may be included. In another embodiment (not shown), the display 101 may be coupled with or arranged adjacent to a touch sensing circuit, a pressure sensor capable of measuring a strength (pressure) of a touch, and/or a digitizer for detecting a magnetic-type stylus pen. In an embodiment, at least a part of the sensor module 119 and/or at least a part of the key input device 117 may be arranged in the first regions 110D and/or the second regions 110E.

The audio modules may include a microphone hole 103 and speaker holes. Inside the microphone hole 103 may be arranged a microphone for obtaining external sound, and may also be arranged a plurality of microphones for sensing a direction of the sound in an embodiment. The speaker holes may include an external speaker hole 107 and a call receiver hole 114. In an embodiment, the speaker holes and the microphone hole 103 may be implemented as one hole or a speaker may be included without the speaker holes (e.g., a piezo speaker).

The sensor module 119 may generate an electrical signal or data value corresponding to an internal operating state or external environmental state of the electronic device 100. The sensor module 119 may include a first sensor module (e.g., a proximity sensor), a second sensor module (e.g., a fingerprint sensor) arranged on the first surface 110A of the housing 110, a third sensor module (e.g., a heart rate monitor (HRM) sensor), and/or a fourth sensor module (e.g., a fingerprint sensor) arranged on the second surface 110B of the housing 110. The fingerprint sensor may be arranged on at least one of the first surface 110A (e.g., the display 101) or the second surface 110B of the housing 110. The electronic device 100 may further include at least one of a sensor module (not shown), e.g., a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules may include a first camera module 105, a second camera module 112, and/or a flash 113, which are arranged inside the electronic device 100. The first camera module 105 and the second camera module 112 may include one lens or a plurality of lenses, an image sensor, and/or an image signal processor. The flash 113 may include, for example, a light-emitting diode or a xenon lamp. In an embodiment, two or more lenses (e.g., an IR camera, a wide lens, and a telephoto lens) and image sensors may be arranged on a surface of the electronic device 100.

The key input device 117 may be arranged on the side surface 110C of the housing 110. In another embodiment, the electronic device 100 may completely or partially exclude the key input device 117, and the key input device 117, that is excluded, may be implemented in other forms such as a soft key, etc., on the display 101. In an embodiment of the disclosure, the key input device may include a sensor module 119 arranged on the second surface 110B of the housing 110.

The light-emitting element (not shown) may be arranged, for example, on the first surface 110A of the housing 110. The light-emitting element may provide state information of the electronic device 100 in the form of light. In another embodiment, the light-emitting element may provide a light source operating with an operation of the first camera module 105. The light-emitting element may include, for example, a light-emitting diode (LED), an IR LED, or a xenon lamp.

The connector holes may include a first connector hole 108 capable of accommodating a connector (e.g., a universal serial bus (USB) connector) for transmitting and receiving power and/or data to and from an external electronic device and/or a second connector hole (e.g., an earphone jack) 109 capable of accommodating a connector for transmitting and receiving an audio signal to and from the external electronic device.

Referring to FIG. 2A, the electronic device 100 may include a side bezel structure 210, a first support member (e.g., a bracket) 211, the front plate 102, the display 101, a printed circuit board (not shown), a battery 250, a second support member 260 (e.g., a rear case), an antenna (not shown), and the rear cover 111. In an embodiment, the electronic device 200 may exclude at least one (e.g., the first support member 211 or the second support member 260) of the components or other components may be added.

The first support member 211 may be arranged inside the electronic device 100 and may be connected with the side bezel structure 210 or may be formed as one piece with the side bezel structure 210. The first support member 211 may be formed of, for example, a metal material and/or a nonmetal (e.g., polymer) material. The first support member 211 may be coupled with the display 101 on a surface thereof and with the printed circuit board on another surface thereof. A processor, a memory, and/or an interface may be mounted on the printed circuit board. The processor may include one or more of, for example, a central processing unit, an application processor, a graphical processor, an image signal processor, a sensor hub processor, or a communication processor.

The second support member 260 may be arranged inside the electronic device 100. The second support member 260 may be formed of, for example, a metal material and/or a nonmetal (e.g., polymer) material. The second support member 260 may be coupled with an antenna on a surface thereof.

The memory may include, for example, a volatile and/or nonvolatile memory.

An interface may include a high-definition multimedia interface (HDMI), a USB interface, a secure digital (SD) card interface, and/or an audio interface. The interface may electrically or physically connect, for example, the electronic device 100 with the external electronic device, and may include an USB connector, an SD card/MMC connector, or an audio connector.

The battery 250 may be a device for supplying power to at least one component of the electronic device 100, and may include, e.g., a primary cell which is not rechargeable, a secondary cell which is rechargeable, or a fuel cell. At least a part of the battery 250 may be arranged on substantially the same plane as, for example, the printed circuit board. The battery 250 may be arranged as one piece inside the electronic device 100 or may be arranged removably from the electronic device 100.

The antenna (not shown) may be arranged between the rear cover 111 and the battery 250. The antenna may include, for example, a near field communication (NFC) antenna, a wireless charging antenna, and/or a magnetic secure transmission (MST) antenna. The antenna may perform short-range communication with or wirelessly transmit and receive power needed for charging, to and from, for example, an external device. In another embodiment, an antenna structure may be formed by a part or a combination of the side bezel structure 210 and/or the first support member 211.

Figure 3:
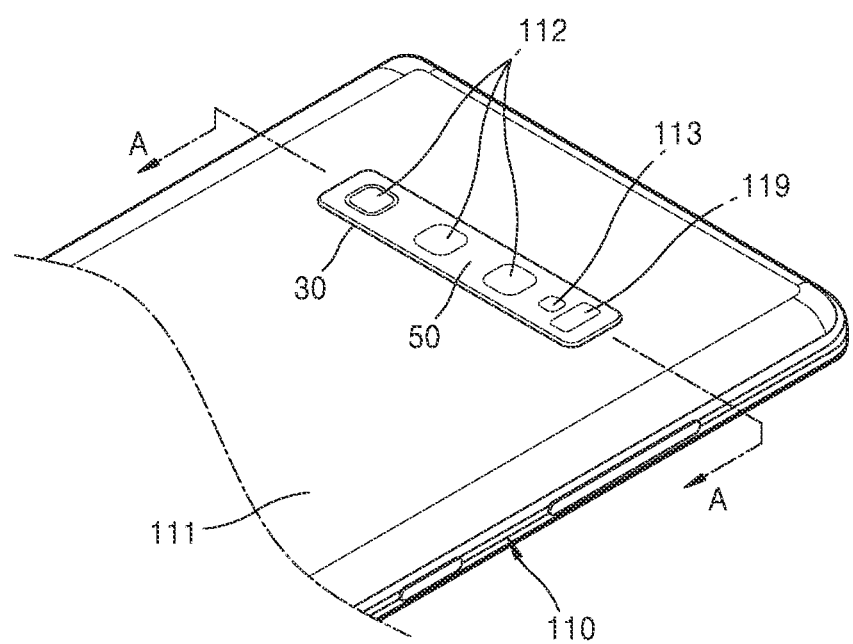
FIG. 3 is an enlarged view of a portion of an electronic device according to an embodiment.
Figure 4:
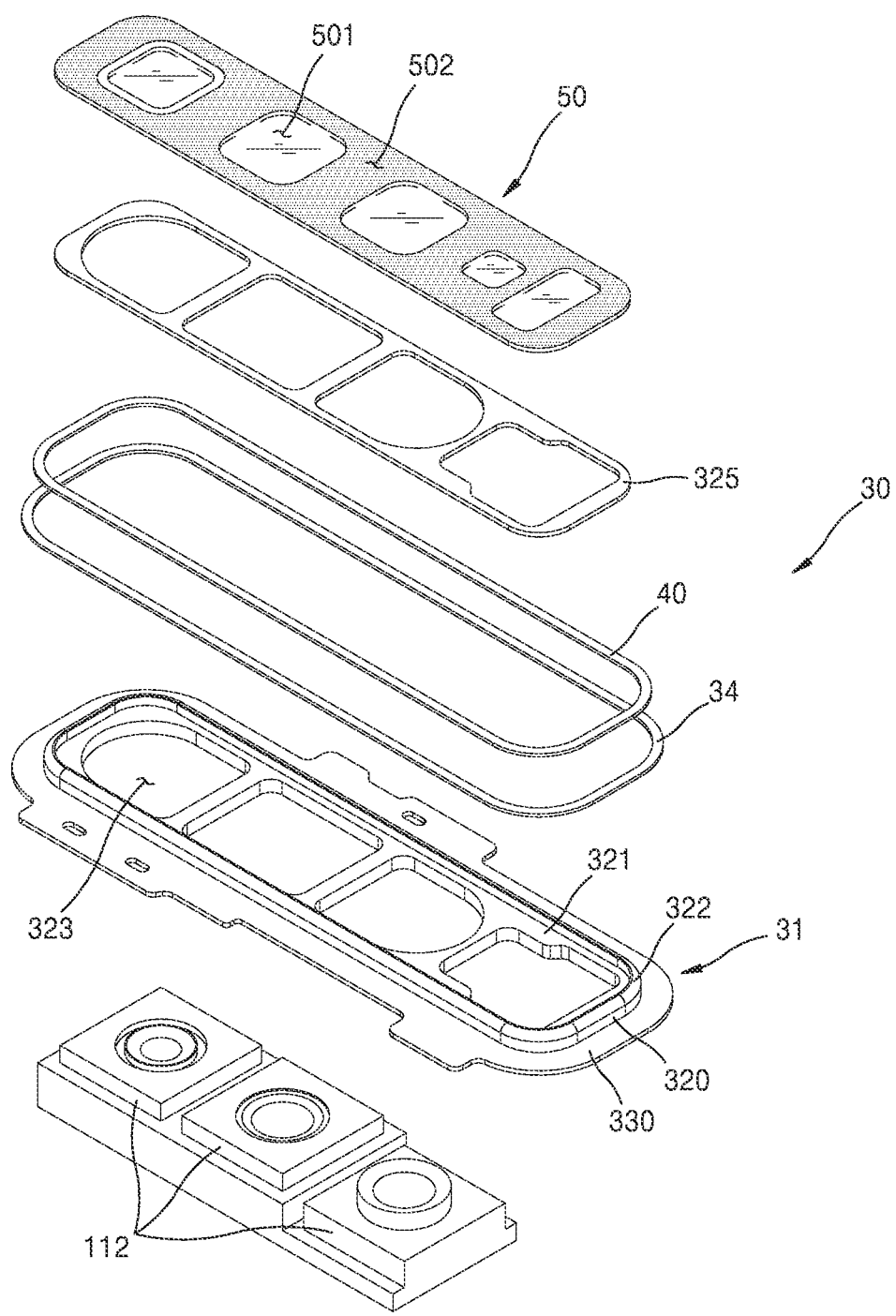
FIG. 4 is an exploded perspective view of a window frame of an electronic device and a peripheral member of the window frame, according to an embodiment.
Figure 5:
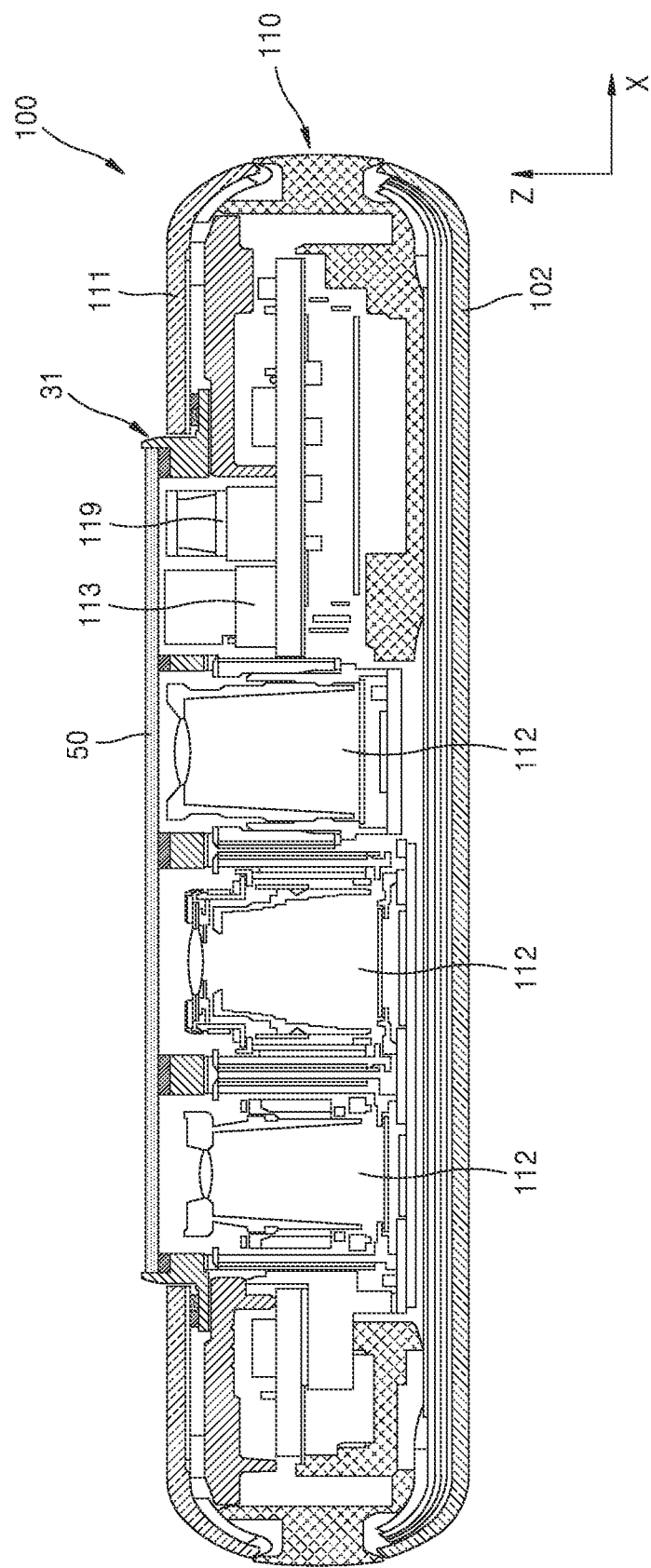
FIG. 5 is a cross-sectional view of FIG. 3.
Figure 6:
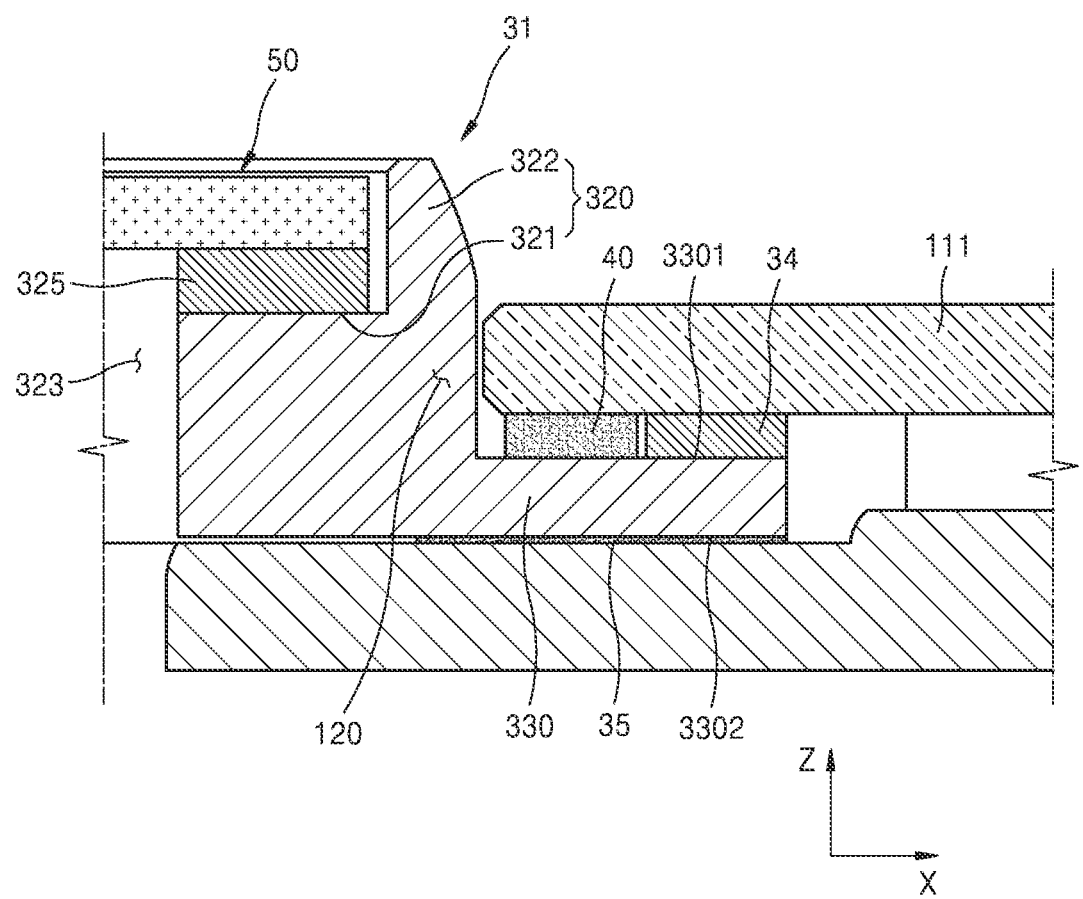
FIG. 6 is a cross-sectional view enlarging a part of FIG. 5.

FIG. 3 is an enlarged view of a portion of the electronic device 100 according to an embodiment, FIG. 4 is an exploded perspective view of a window frame 30 of the electronic device 100 and a peripheral member of the window frame 30, according to an embodiment, and FIG. 5 is a cross-sectional view of FIG. 3. FIG. 6 is an enlarged view of a part of FIG. 5.

Referring to FIGS. 3 through 6, the second camera module 112 (or an electronic module) may be arranged to be oriented to the rear direction (hereinafter, a 'first direction Z') inside the housing 110. The second camera module 112 may have a height (or a thickness) greater than or equal to a certain value in the first direction Z due to an internal component such as a lens, etc. For example, the height of the second camera module 112 may be greater than or equal to 50% of the total height of the electronic device 100. However, the height of the second camera module 112 may be less than or equal to 90% of the total height of the electronic device 100.

The camera window 50 (or window) may be arranged in front of the second camera module 112 in the first direction Z. The camera window 50 may protect the second camera module 112 from an external environment.

The camera window 50 may include at least one of glass, acryl, or transparent plastic.

The camera window 50 may include a transparent region 501 and an opaque region 502 arranged in the circumference of the transparent region 501. Through the transparent region 501 of the camera window 50, external light may be delivered to the second camera module 112.

There may be a plurality of the transparent region 501. Through the plurality of the transparent region 501, external light may be delivered to a plurality of the second camera module 112.

The rear cover 111 may be coupled with the housing 110. The rear cover 111 may be arranged on the rear surface of the housing 110. For example, the rear cover 111 may be configured to be fittedly coupled to the side bezel structure 210 of the housing 110.

The rear cover 111 may include an opening 120 into which the camera window 50 is insertable. The opening 120 may be a single opening as shown in the drawing, but may also be a plural openings without being limited thereto.

The window frame 30 may support the camera window 50, and may be mounted on the rear cover 111. To this end, the window frame 30 may include a frame body 31 and a retention member.

The frame body 31 may be composed of a material that is similar to that of the housing 110. For example, the frame body 31 may be formed of, for example, a metal material and/or a nonmetal (e.g., polymer) material. As an example of the metal material, aluminum, stainless steel (STS), etc., may be used.

The frame body 31 may include a support portion 320 and a mounting portion 330.

The support portion 320 may be arranged in the opening 120 of the rear cover 111 and support the camera window 50 to fix the camera window 50. The support portion 320 may include at least one opening 323 into which a part of the second camera module 112 is insertable. However, a part of the second camera module 112 may not be necessarily inserted into the opening 323, and an end portion of the second camera module 112 may not be inserted into the opening 323. The center of the opening 323 may be arranged in a line with an optical axis of the second camera module 112, without being necessarily limited thereto. The opening 323 of the support portion 320 may be a plural openings, but may also be single opening, without being limited thereto.

The support portion 320 may have a substantially rectangular structure and a corner thereof may have a curved shape. However, the shape of the support portion 320 may not be limited thereto, and may vary with the shape of the camera window 50. The camera window 50 may have various shapes according to the shape and arrangement of the second camera module 112.

The support portion 320 may include a seating portion 321 on which the camera window 50 is seated and an edge portion 322 surrounding the edge of the camera window 50. The edge portion 322 may extend from the seating portion 321 in the first direction Z. The height of the edge portion 322 in the first direction Z may be properly designed considering a sum of the height of the camera window 50 and the height of a first adhesive member 325 (or body). Herein, the height may be defined as a height in the first direction Z.

The support portion 320 may protrude from the external surface of the rear cover 111 in the first direction Z. However, although not shown, the support portion 320 may not protrude from the external surface of the rear cover 111 in the first direction Z, without being limited thereto.

The camera window 50 may be fixed to the seating portion 321 by the first adhesive member 325. The first adhesive member 325 may be in the form of a double-sided adhesive tape or may be an adhesive material.

The first adhesive member 325 may have a continuous closed-loop shape and provide a waterproof function. For example, introduction of water or moisture between the camera window 50 and the seating portion 321 may be blocked by the first adhesive member 325.

The mounting portion 330 may extend from the support portion 320 in a second direction X that is perpendicular to the first direction Z. The mounting portion 330 may have a closed-loop shape surrounding the support portion 320.

The height of the mounting portion 330 may be less than that of the support portion 320. The height of the mounting portion 330 may be less than or equal to 0.3 mm. The height of the mounting portion 330 may be less than or equal to 0.2 mm.

The mounting portion 330 may be arranged to be overlapped by the rear cover 111 in the first direction Z. The rear cover 111 may be arranged in front of the mounting portion 330 in the first direction Z.

The retention member may be structured such that a first gap G1 (refer to FIG. 7) between the mounting portion 330 and the rear cover 111 in the first direction Z is retained less than or equal to a certain size. For example, the retention member may retain the first gap G1 to be less than or equal to 0.3 mm.

As an example, the retention member may include a second adhesive member 34 (or body) that is arranged between the mounting portion 330 and the rear cover 111 and adheres the mounting portion 330 to the rear cover 111 and an elastic member 35 (or body) that provides an elastic force to the mounting portion 330.

The second adhesive member 34 may be in the form of a double-sided adhesive tape or may be an adhesive material.

The second adhesive member 34 may have a continuous closed-loop shape and provide a waterproof function between the mounting portion 330 and the rear cover 111.

Thus, introduction of water or moisture between the mounting portion 330 and the rear cover 111 may be reduced by the second adhesive member 34.

However, the second adhesive member 34 may not necessarily provide a waterproof function because of the existence of a separate waterproof member 40 to be described later, and may have other shapes depending on a need. For example, the second adhesive member 34 may not have a closed-loop shape, but may have a discontinuous shape.

A surface opposing the mounting portion 330 of the rear cover 111 may be a flat surface. However, a part of the rear cover 111 may be bent or curved. In particular, when the rear cover 111 is formed of a ceramic material, a part of the rear cover 111 may be bent or curved greatly during manufacturing. As a result, it may be difficult to control a gap between the rear cover 111 and the mounting portion 330 during manufacturing.

Figure 7:
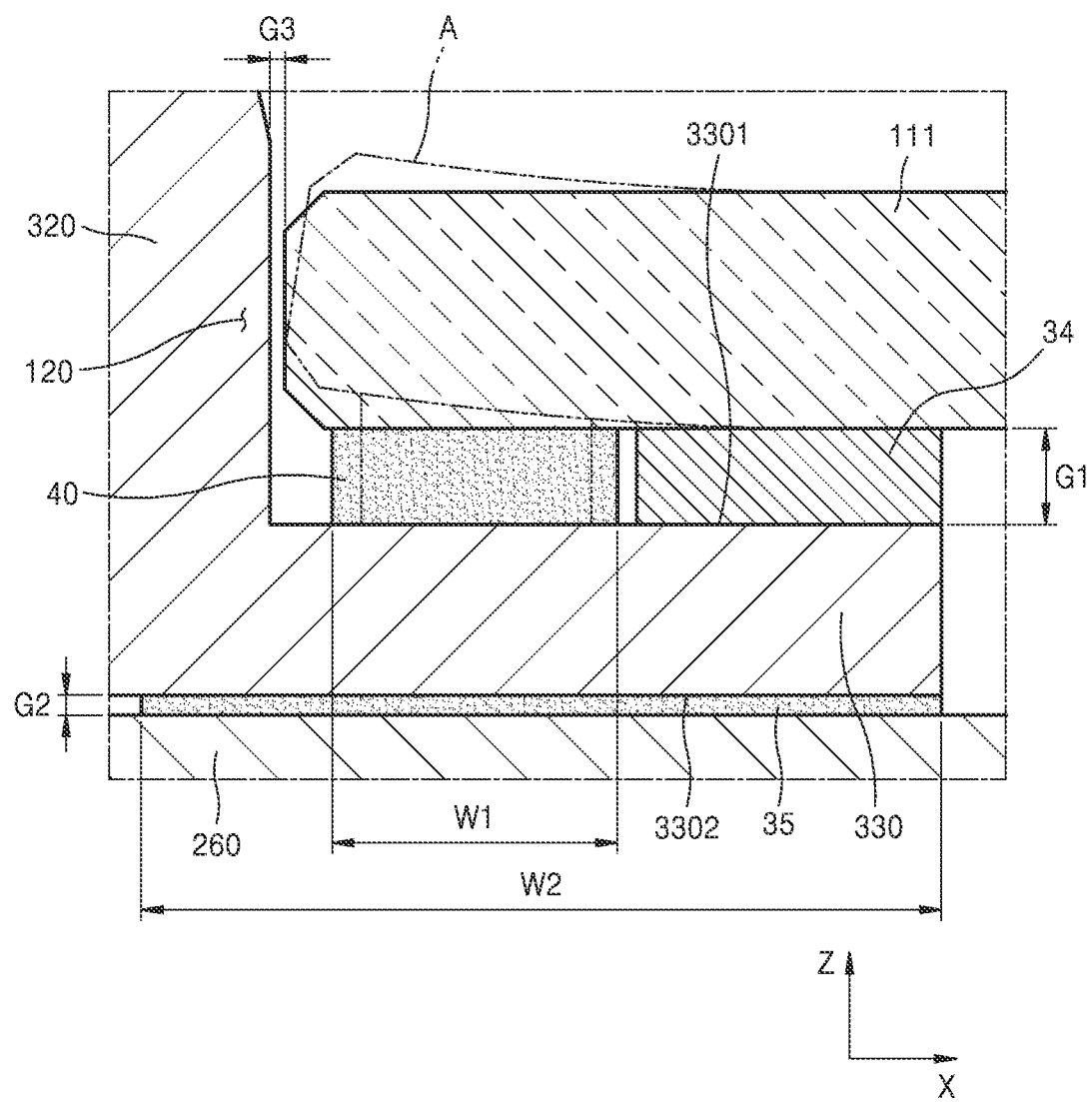
FIG. 7 is a view for describing an operation of a waterproof member in FIG. 6.

FIG. 7 is an enlarged view of a part of FIG. 6. Referring to FIG. 7, as indicated by A, a bend or a curve may occur in an overlapping portion of the rear cover 111 with the mounting portion 330. In this case, an adhesion area (or an adhesion width) between the second adhesive member 34 and the rear cover 111 may be reduced from the originally intended area, resulting in reduction of an adhesive force of the second adhesive member 34. This may act as a cause for degradation of a waterproof function between the rear cover 111 and the mounting portion 330 in the electronic device 100.

In this regard, the electronic device 100 according to an embodiment may further include the waterproof member 40 (or body) that is arranged between the mounting portion 330 and the rear cover 111 and is elastically deformable.

The waterproof member 40 may be softer than the second adhesive member 34. The original height of the waterproof member 40, i.e., the height of the waterproof member 40 before elastically deformed, may be greater than the first gap G1 between the mounting portion 330 and the rear cover 111, which is retained by the second adhesive member 34.

As the waterproof member 40, that is soft, is arranged between the mounting portion 330 and the rear cover 111, the waterproof member 40 may be elastically deformed to provide sealing between the mounting portion 330 and the rear cover 111. Thus, even when a part of the rear cover 111 may be bent or curved, stable sealing may be provided between the mounting portion 330 and the rear cover 111.

As the waterproof member 40 is elastically deformed, in spite of a small size of the waterproof member 40, a force pushing the rear cover 111 away from the mounting portion 330 may be exerted by the waterproof member 40. To prevent the force pushing the rear cover 111 by the waterproof member 40 from weakening the adhesive force of the second adhesive member 34, the degree of elastic deformation of the waterproof member 40 may be designed appropriately. For example, when the first gap G1 between the rear cover 111 and the mounting portion 330 is 0.3 mm, a length by which the waterproof member 40 is contracted in the first direction Z by being elastically deformed may be less than or equal to 0.1 mm. For example, the degree of contraction of the waterproof member 40 due to elastic deformation may be less than or equal to about 33% of the first gap G1 between the rear cover 111 and the mounting portion 330.

The elastic member 35 of the retention member may provide an elastic force to the mounting portion 330 to press the mounting portion 330 toward the rear cover 111. The elastic member 35 may be softer than the second adhesive member 34.

The elastic member 35 may be arranged to contact a second surface 3302 of the mounting portion 330, opposing a first surface 3301 of the mounting portion.

The elastic member 35 may be arranged between the second surface 3302 of the mounting portion 330 and the second support member 260 of the housing 110. The second support member 260 may include an opening 261 (see FIG. 2) through which the second camera module 112 passes. However, the arrangement of the elastic member 35 is not necessarily limited thereto, such that according to a structure of the housing 110, the elastic member 35 may be arranged between another portion of the housing 110 and the second surface 3302 of the mounting portion 330.

The original height of the elastic member 35 may be greater than a second gap G2 between the mounting portion 330 and the second support member 260 of the housing 110 in the first direction Z. Herein, the second gap G2 may mean a gap between a part, other than the elastic member 35, arranged closest to the second surface 3302 of the mounting portion 330 in the housing 110 in the first direction Z. For example, as shown in FIG. 7, when the part arranged closest to the second surface 3302 of the mounting portion 330 in the housing 110 is the second support member 260, the second gap G2 may be a gap between the mounting portion 330 and the second support member 260 in the first direction Z. As another example, although not shown, when another part of the housing 110 is arranged closest to the second surface 3302 of the mounting portion 330, the second gap G2 may be a gap between the mounting portion 330 and the another part of the housing 110 in the first direction Z.

As the elastic member 35 is arranged below the second gap G2 between the mounting portion 330 and the second support member 260 of the housing 110, the elastic member 35 may be elastically deformed and the elastic member 35, when elastically deformed, may press the mounting portion 330 toward the rear cover 111.

As the mounting portion 330 is pressed, a waterproof function of the waterproof member 40 arranged between the mounting portion 330 and the rear cover 111 may be improved. As the mounting portion 330 is pressed, the second adhesive member 34 may be pressed toward the rear cover 111, thus improving an adhesive force of the second adhesive member 34 with respect to the rear cover 111.

Moreover, the mounting portion 330 is arranged between the elastic member 35 and the waterproof member 40, thereby preventing tilt of the window frame 30 from occurring due to an external shock.

The material of the elastic member 35 may be selected based on the material of the waterproof member 40.

In an example, the elastic member 35 may include the same material as that of the waterproof member 40.

In another example, the elastic member 35 may be softer than the waterproof member 40. In this case, the elastic member 35 may provide a greater pressure to the waterproof member 40 than when the elastic member 35 has the same material as that of the waterproof member 40.

At least a part of the elastic member 35 may be arranged to be overlapped by the waterproof member 40 in the first direction Z.

For example, as shown in FIG. 7, a width W2 of the elastic member 35 in a second direction X may be greater than a width W1 of the waterproof member 40 in the second direction X. A part of the elastic member 35 may be overlapped by the waterproof member 40 in the first direction Z, and another part of the elastic member 35 may be overlapped by the second adhesive member 34 in the first direction Z.

Figure 8:
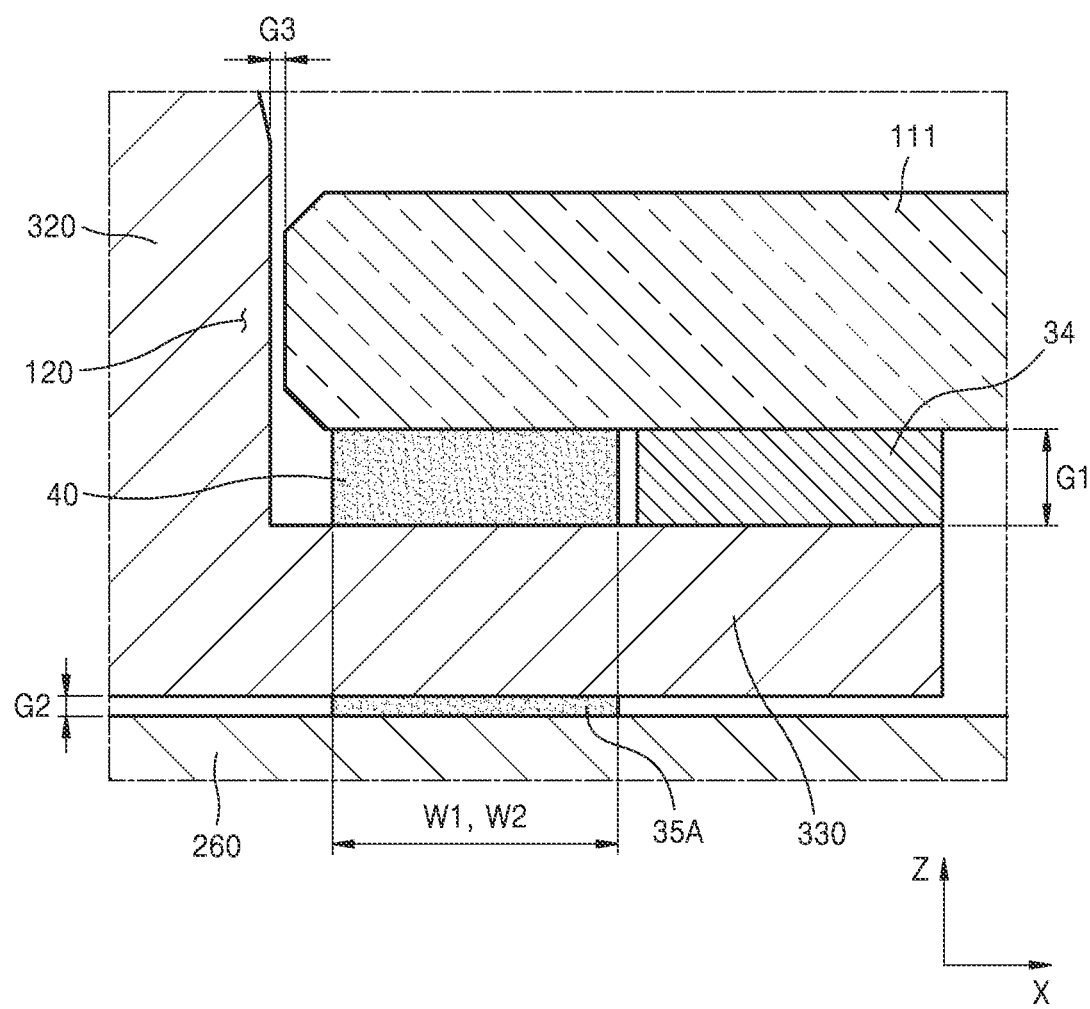
FIG. 8 is a view describing a waterproof member and a retention member of an electronic device, according to another embodiment.

In another example, as shown in FIG. 8, the width W2 of an elastic member 35A in the second direction X may be equal to the width W1 of the waterproof member 40 in the second direction X. The elastic member 35A may be overlapped by the waterproof member 40 in the first direction Z, and may not be overlapped by the second adhesive member 34 in the first direction Z. In another example, although not shown in the drawing, the elastic member 35A may not be overlapped by the waterproof member 40 in the first direction Z, and may be overlapped by the second adhesive member 34 in the first direction Z.

FIGS. 9 through 15 are views for describing the waterproof member 40 and the retention member of the electronic device 100, according to other embodiments.

Figure 9:
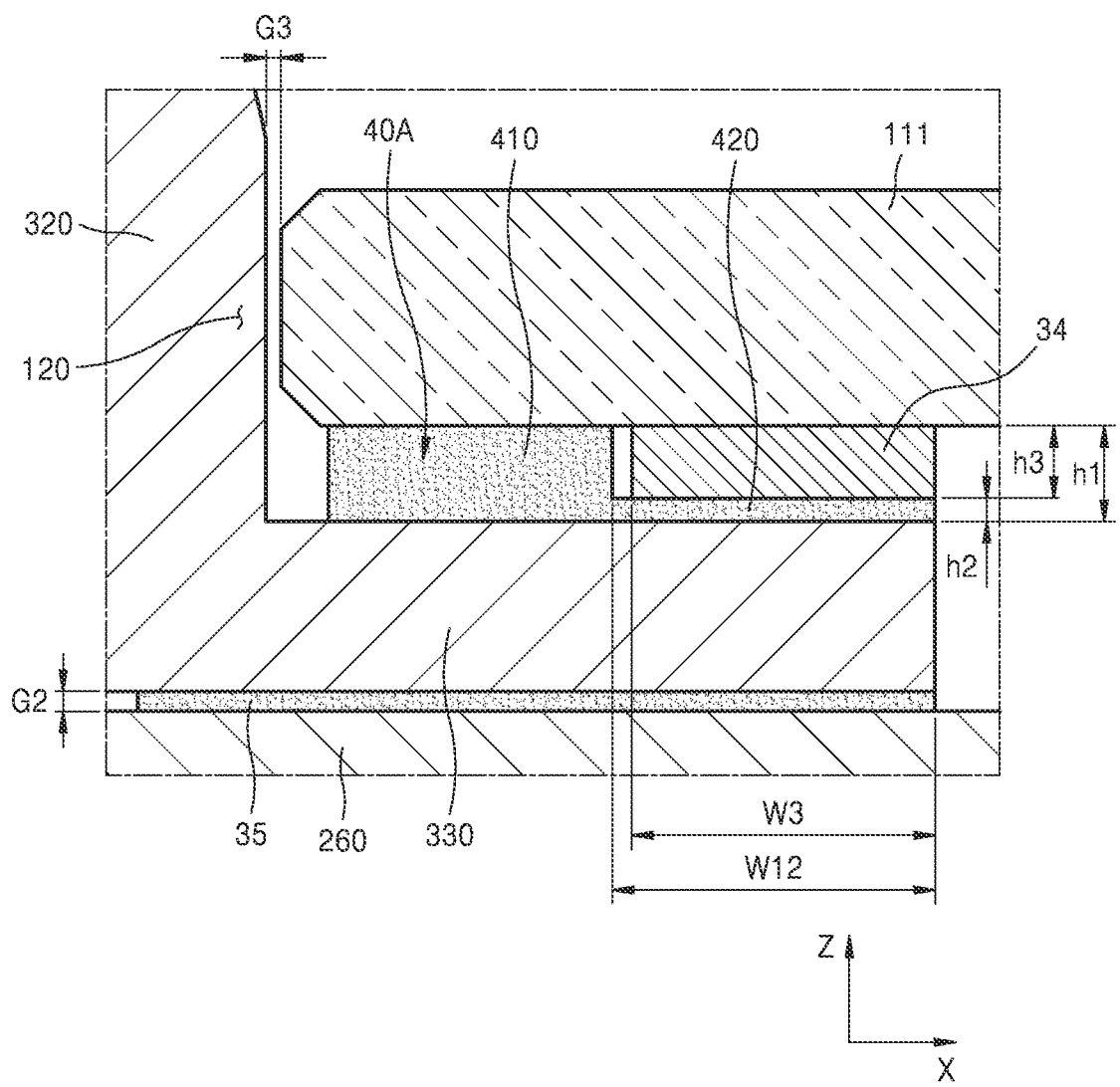
FIG. 9 is a view describing a waterproof member and a retention member of an electronic device, according to another embodiment.
Figure 10:
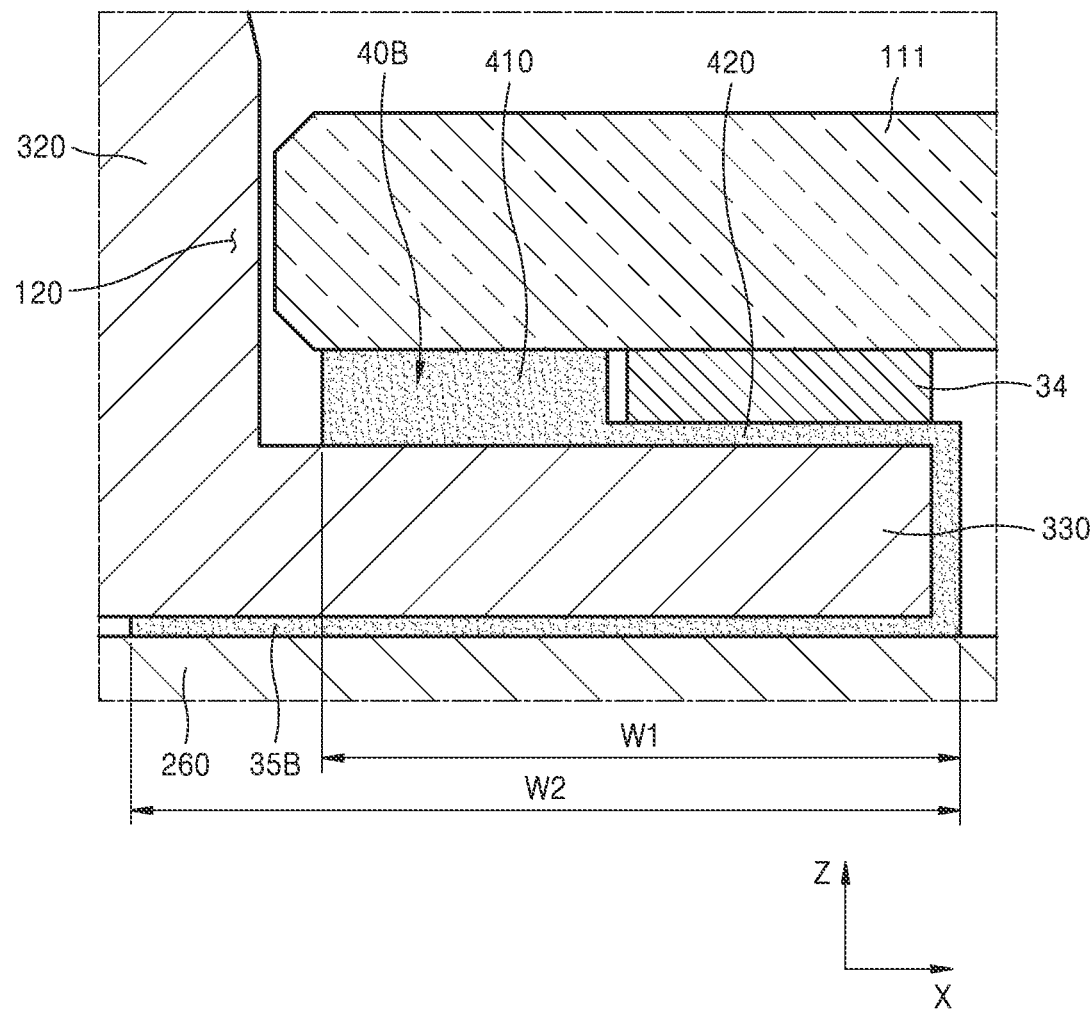
FIG. 10 is a view describing a waterproof member and a retention member of an electronic device, according to another embodiment.

Referring to FIGS. 9 and 10, a waterproof member 40A may include a first portion 410 arranged to contact the mounting portion 330 and the rear cover 111, and a second portion 420 arranged between the second adhesive member 34 and the mounting portion 330. The second portion 420 may extend from the first portion 410 in the second direction X. The first portion 410 and the second portion 420 may be softer than the second adhesive member 34 to be elastically deformed.

The first portion 410 may be elastically deformed to seal the mounting portion 330 and the rear cover 111, and the second portion 420 may be elastically deformed to press the second adhesive member 34 to the rear cover 111.

The height and width of the second portion 420 may be designed based on a space for arranging the second adhesive member 34. For example, a height h2 of the second portion 420 may be less than a height h1 of the first portion 410, and a difference (=h1−h2) between the first portion 410 and the second portion 420 may correspond to a height h3 of the second adhesive member 34. A width W12 of the second portion 420 in the second direction X may be greater than a width W3 of the second adhesive member 34 in the second direction X. Before the waterproof member 40A is elastically deformed, the difference (=h1−h2) between the first portion 410 and the second portion 420 may be greater than the height h3 of the second adhesive member 34. As the waterproof member 40A is arranged between the rear cover 111 and the mounting portion 330, the waterproof member 40A may be elastically deformed, such that the difference (=h1−h2) between the first portion 410 and the second portion 420 may be equal to or greater than the height h3 of the second adhesive member 34.

A waterproof member 40B may include the same material as the elastic member 35. Referring to FIG. 10, the waterproof member 40B may be formed as one piece with an elastic member 35B. The elastic member 35B may extend from the second portion 420.

Figure 11:
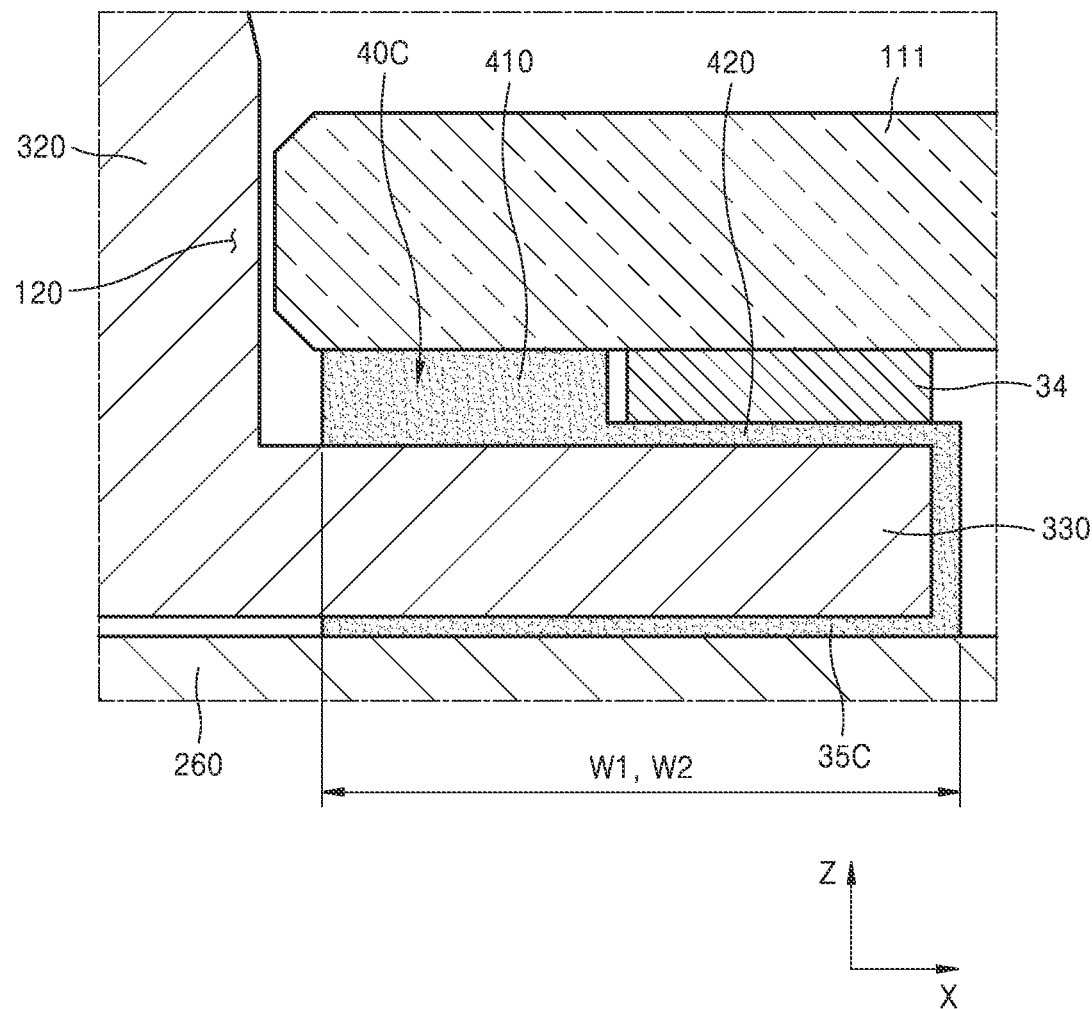
FIG. 11 is a view describing a waterproof member and a retention member of an electronic device, according to another embodiment.

The width W2 of the elastic member 35B may be greater than the width W1 of the waterproof member 40B. However, the width W2 of the elastic member 35B may be various widths, without being limited thereto. In an example, as shown in FIG. 11, the width W2 of the elastic member 35C may be equal to the width W1 of the waterproof member 40C. In another example, although not shown in the drawing, the width of the elastic member 35 may be less than that of the waterproof member 40.

Referring back to FIGS. 6 and 7, a third gap G3 may be in the second direction X between the support portion 320 and the rear cover 111. The waterproof member 40 may be arranged not to be exposed to (e.g. be in) the third gap G3 between the support portion 320 and the rear cover 111.

Figure 12:
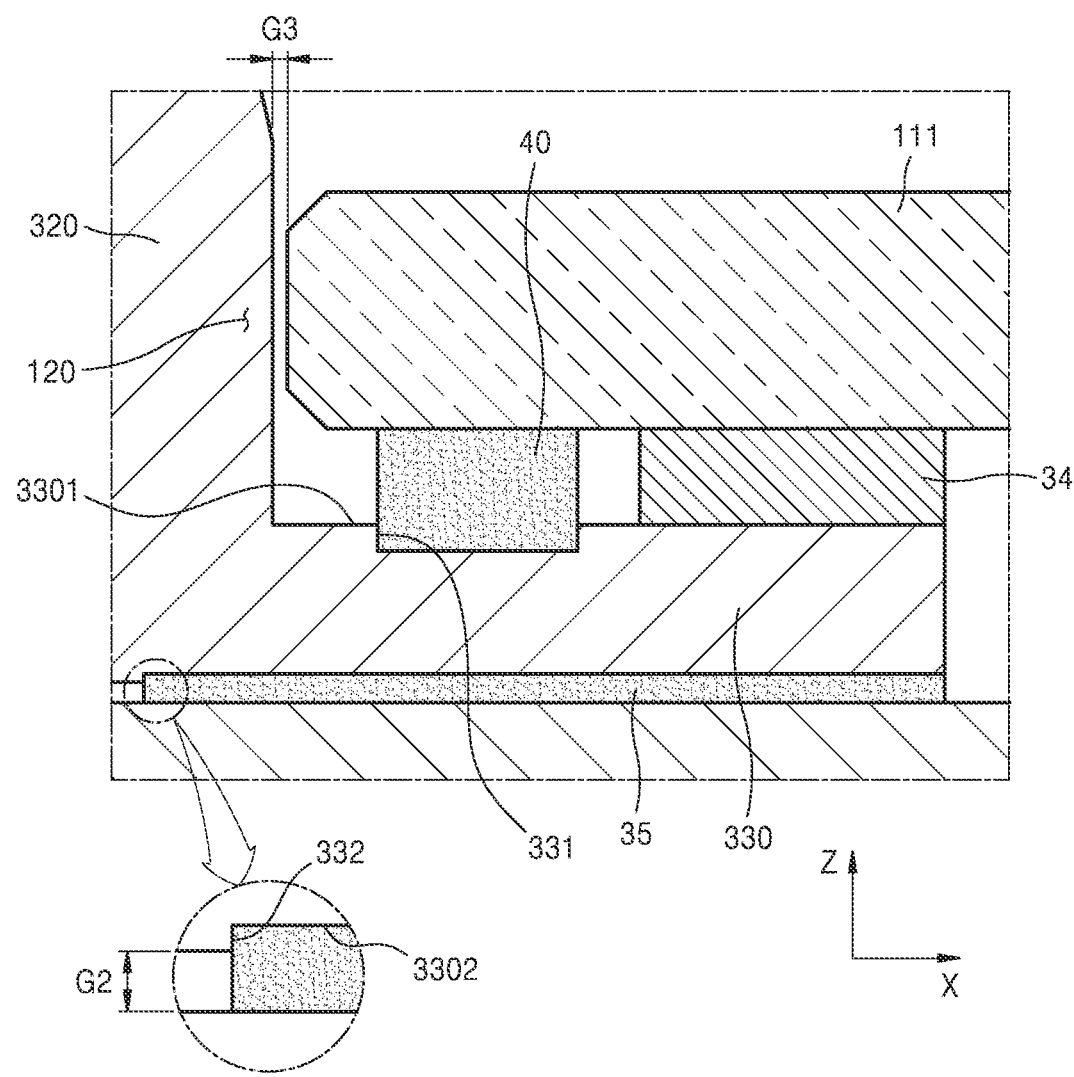
FIG. 12 is a view describing a waterproof member and a retention member of an electronic device, according to another embodiment.
Figure 13:
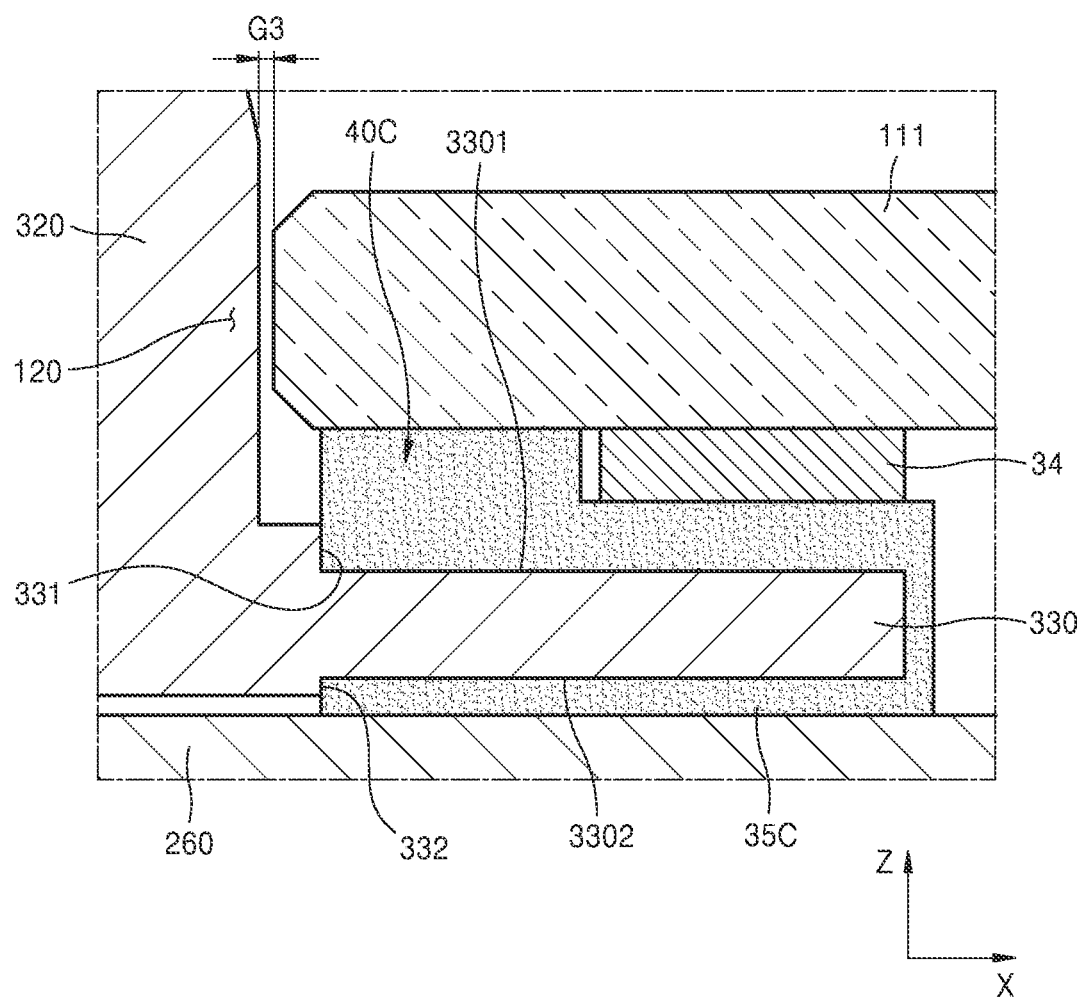
FIG. 13 is a view describing a waterproof member and a retention member of an electronic device, according to another embodiment.

For example, the waterproof member 40 may be arranged more peripheral than the opening 120 of the rear cover 111 in the second direction X. As shown in FIGS. 12 and 13, a step 331 may be formed on the first surface 3301 opposing the rear cover 111 in the mounting portion 330. With the step 331, the waterproof member 40, that is elastically deformed, may be prevented from being exposed (e.g. be in) to the third gap G3.

Figure 14:
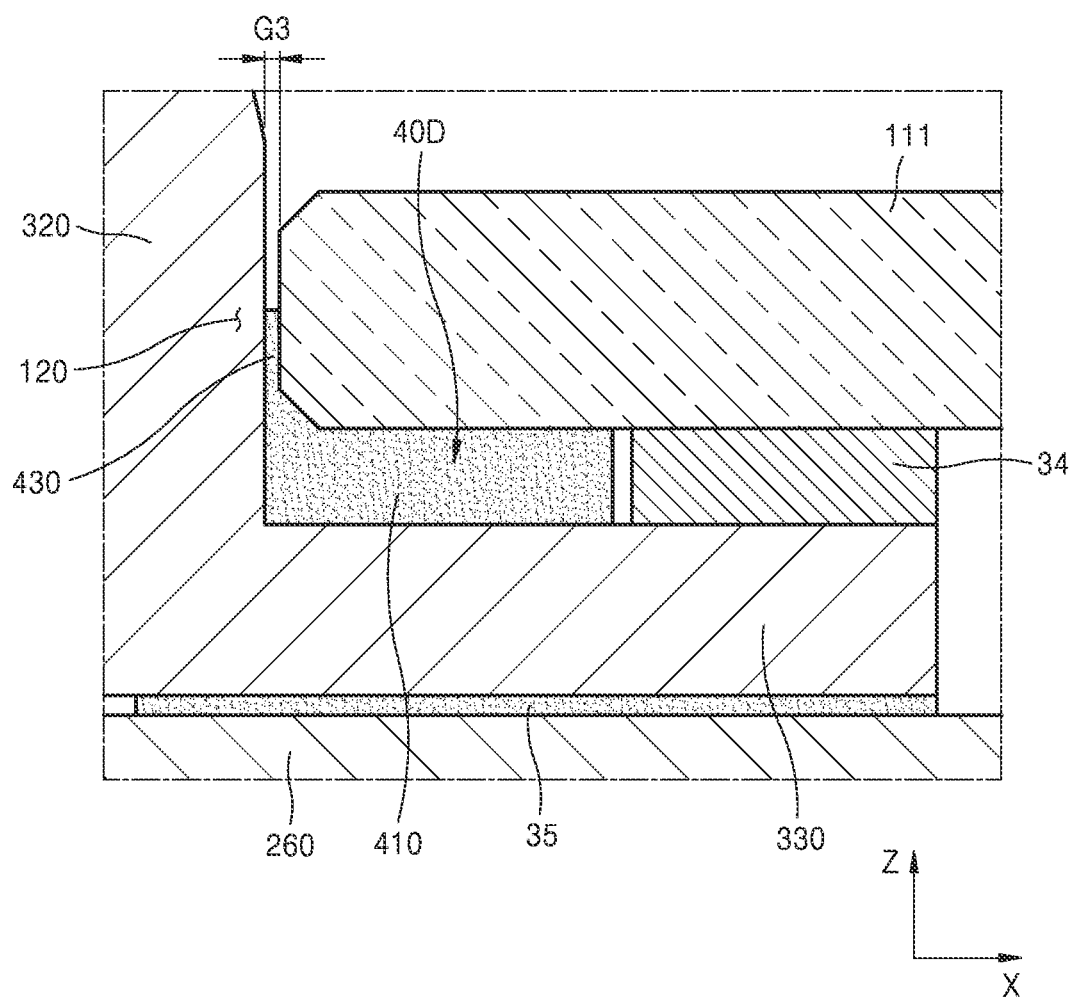
FIG. 14 is a view describing a waterproof member and a retention member of an electronic device, according to another embodiment.

However, the waterproof member 40 may not be necessarily arranged to avoid being exposed to the third gap G3, such that a part of the waterproof member 40 may be exposed to the third gap G3. For example, as shown in FIG. 14, a waterproof member 40D may include a first portion 410 arranged to contact the mounting portion 330 and the rear cover 111, and a third portion 430 filled in the third gap G3.

Figure 20:
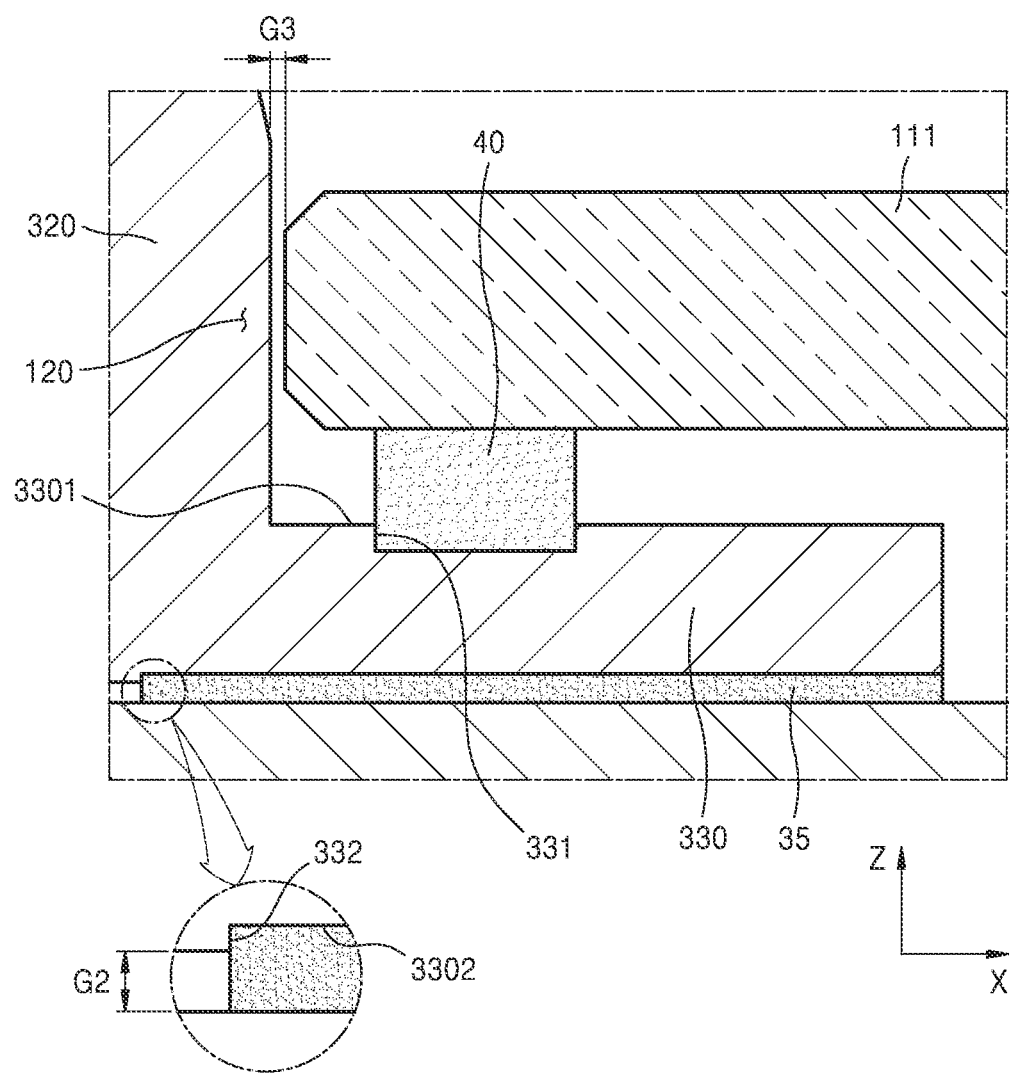
FIG. 20 is a view for describing a retention member of an electronic device, according to another embodiment.
Figure 21:
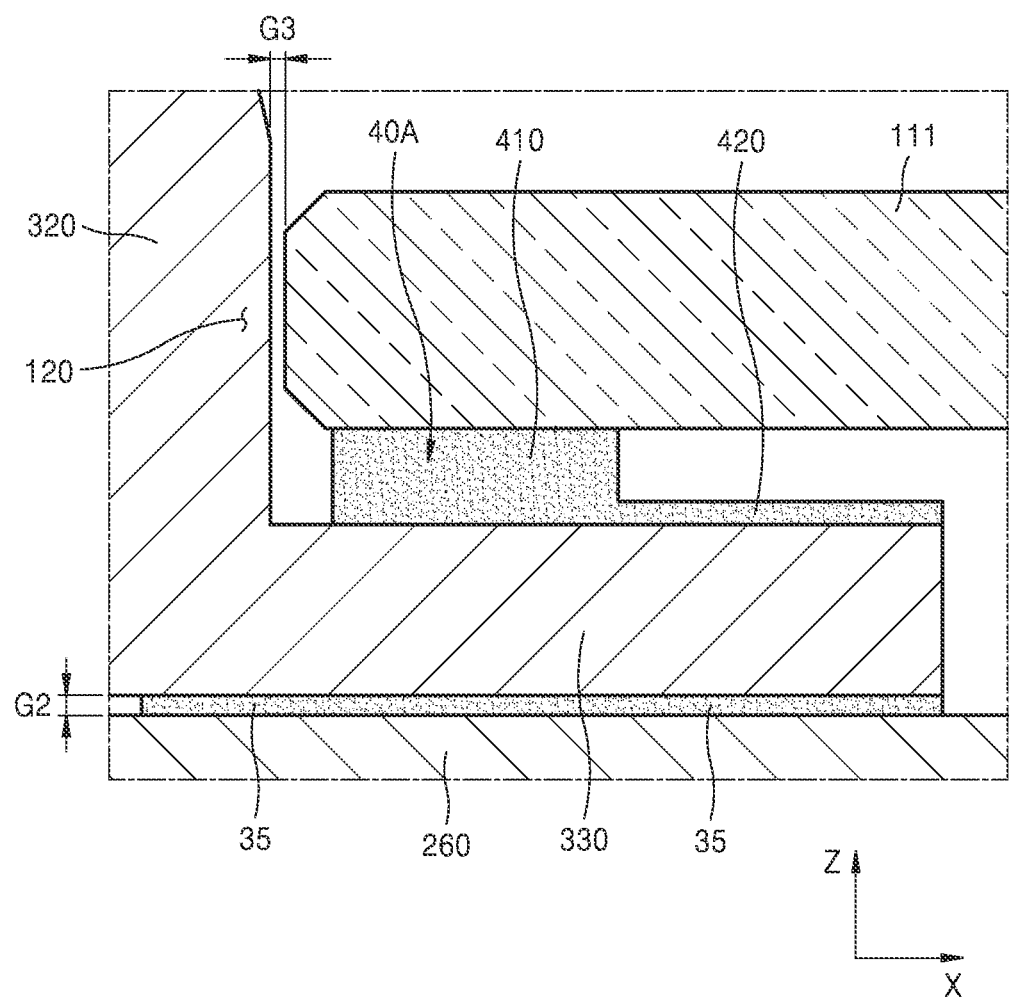
FIG. 21 is a view for describing a retention member of an electronic device, according to another embodiment.
Figure 22:
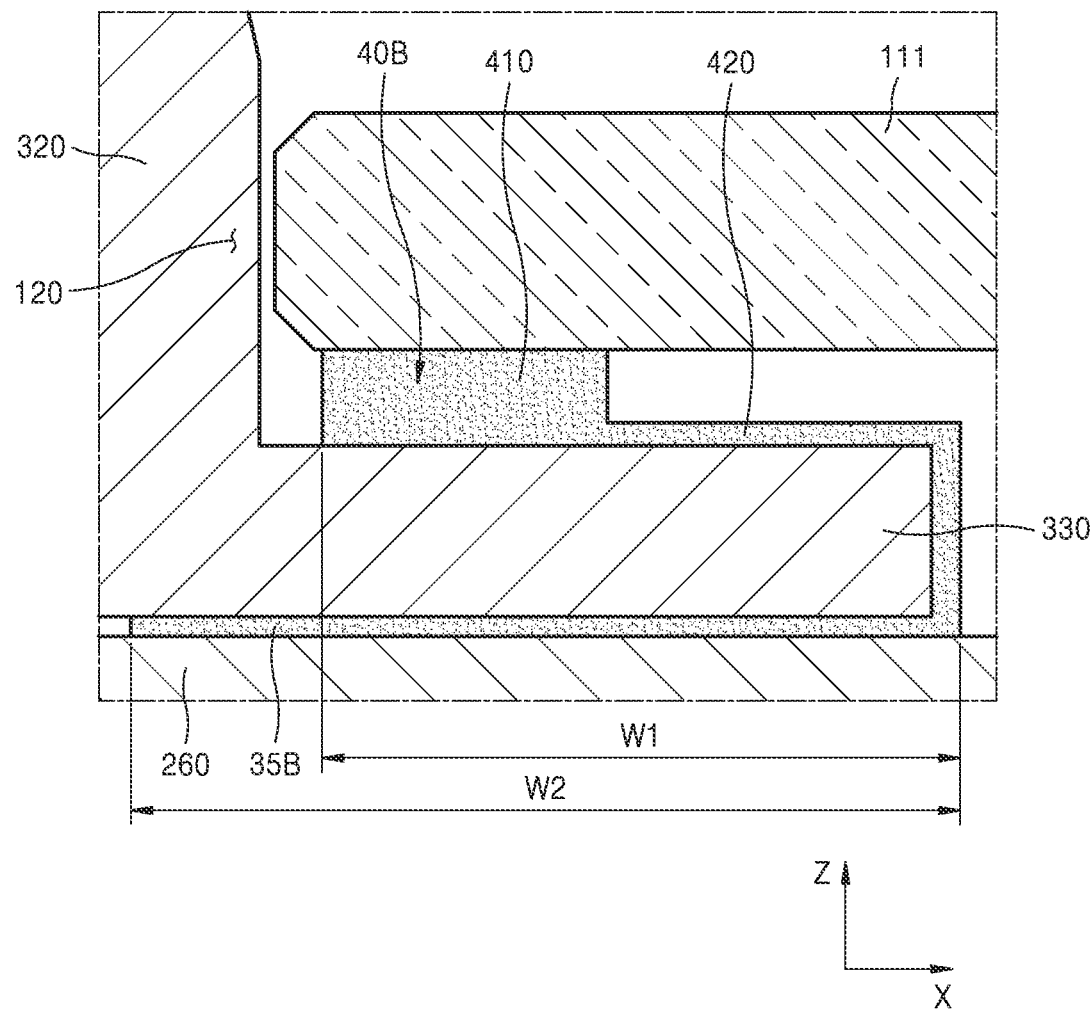
FIG. 22 is a view for describing a retention member of an electronic device, according to another embodiment.
Figure 23:
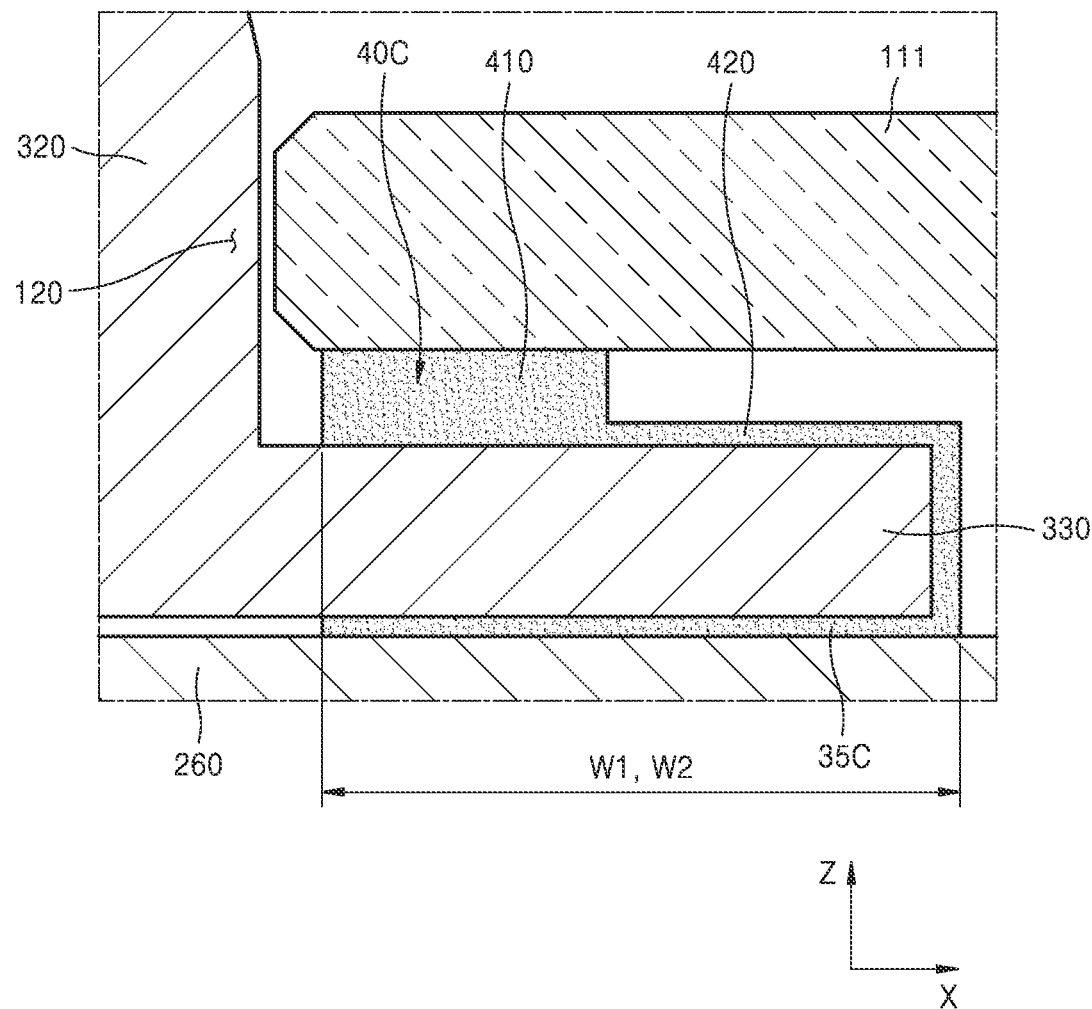
FIG. 23 is a view for describing a retention member of an electronic device, according to another embodiment.

The elastic member 35 may be arranged more peripheral than the opening 323 (see FIG. 6) of the support portion 320 in the second direction X. For example, a step 332 (see FIG. 20) into which a part of the elastic member 35 is inserted may be formed on the second surface 3302 of the mounting portion 330. With the step 332, the position of the elastic member 35 that is elastically deformed may be controlled.

Figure 15:
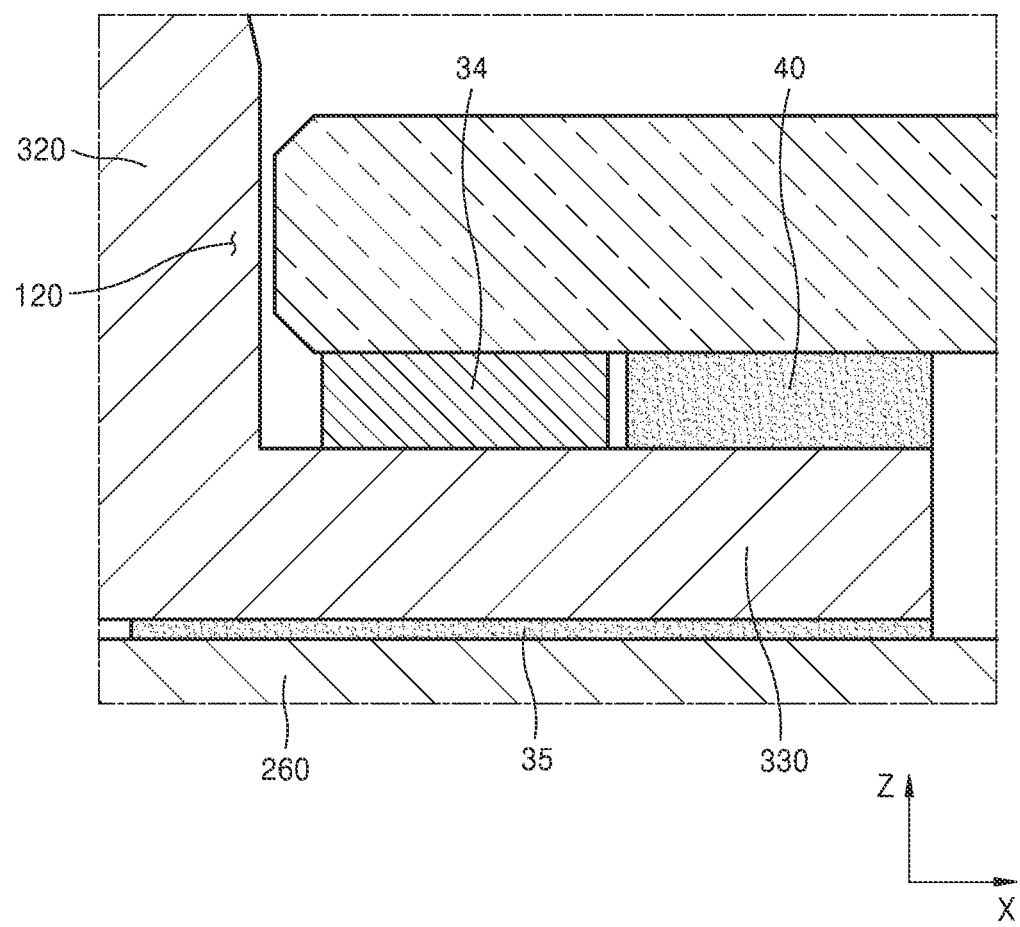
FIG. 15 is a view describing a waterproof member and a retention member of an electronic device, according to another embodiment.

Referring back to FIG. 7, the waterproof member 40 may be arranged more inward than the second adhesive member 34. The waterproof member 40 may be arranged closer to the support portion 320 than the second adhesive member 34. However, the arrangement of the waterproof member 40 and the second adhesive member 34 is not limited thereto, and as shown in FIG. 15, the waterproof member 40 may be arranged outer with respect to the second adhesive member 34.

In the embodiments according to FIGS. 6 through 15, a description has been made of examples where the retention member includes the second adhesive member 34 and the elastic member 35. However, the retention member may not necessarily include both the second adhesive member 34 and the elastic member 35, and depending on a case, one of the second adhesive member 34 and the elastic member 35 may be omitted.

Figure 16:
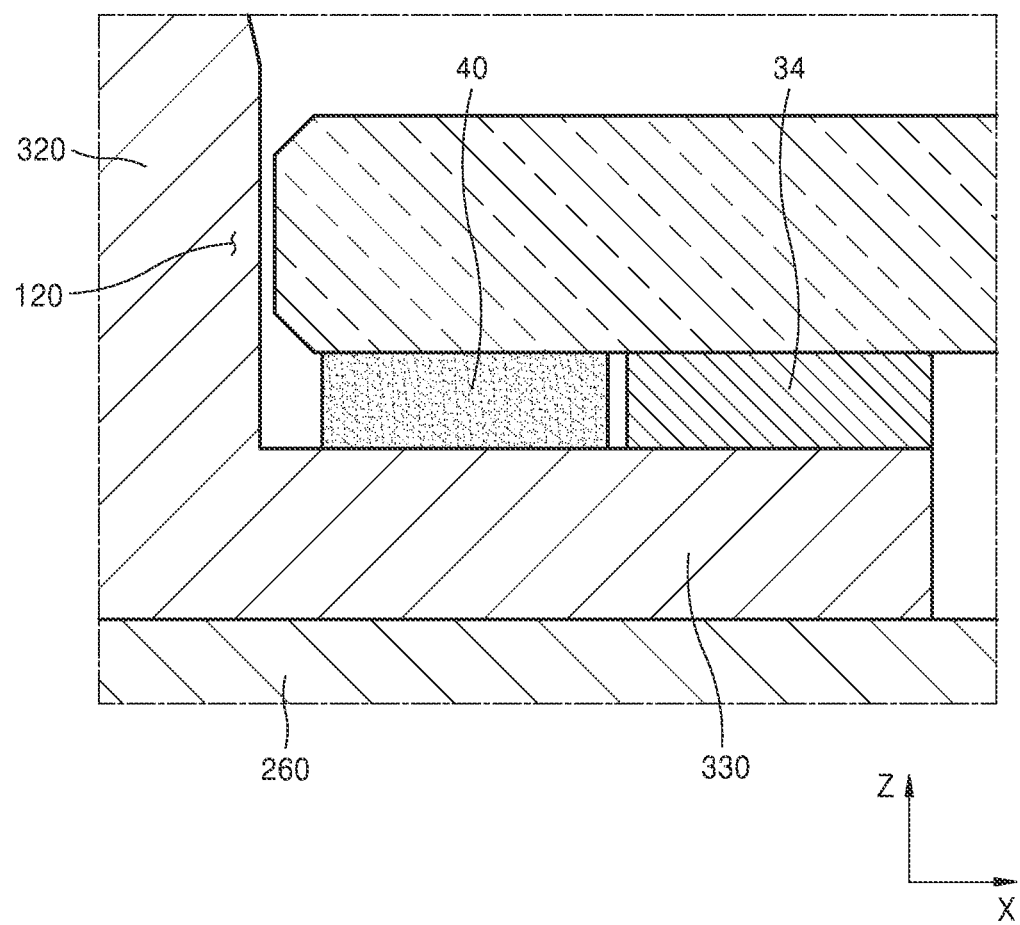
FIG. 16 is a view for describing a retention member of an electronic device, according to another embodiment.
Figure 17:
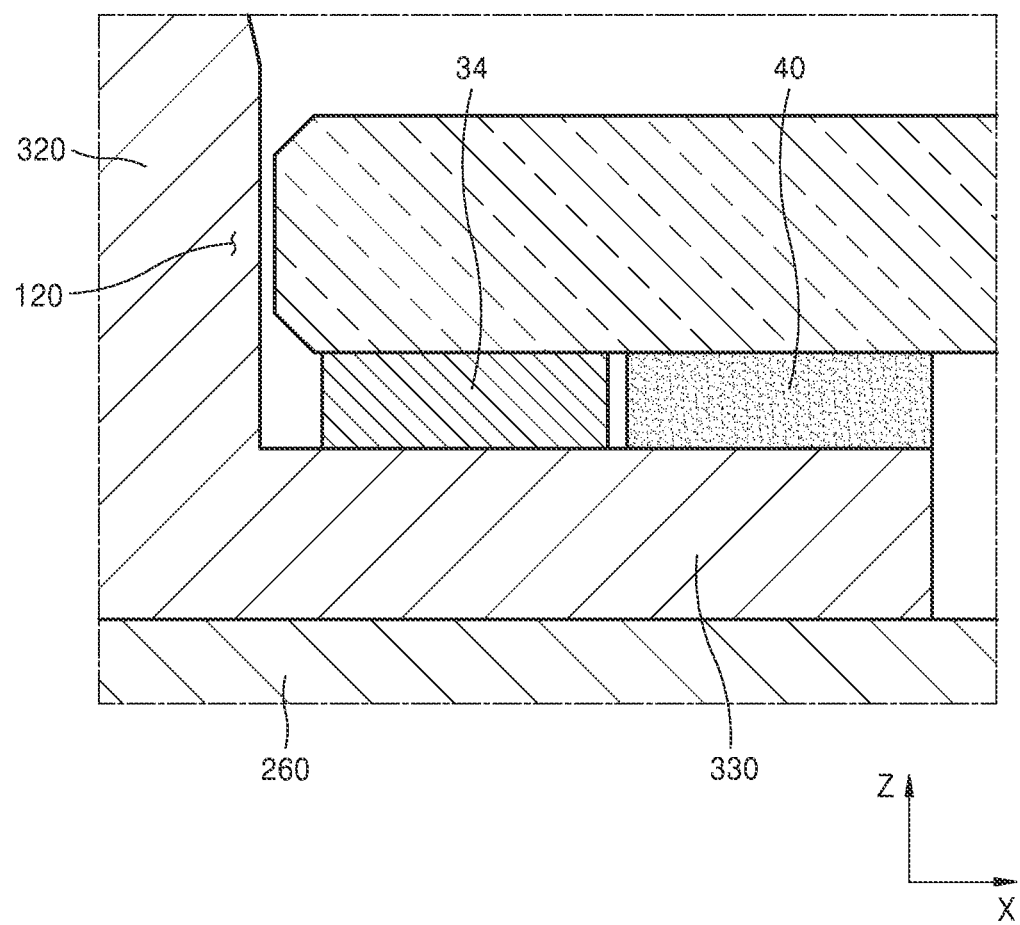
FIG. 17 is a view for describing a retention member of an electronic device, according to another embodiment.
Figure 18:
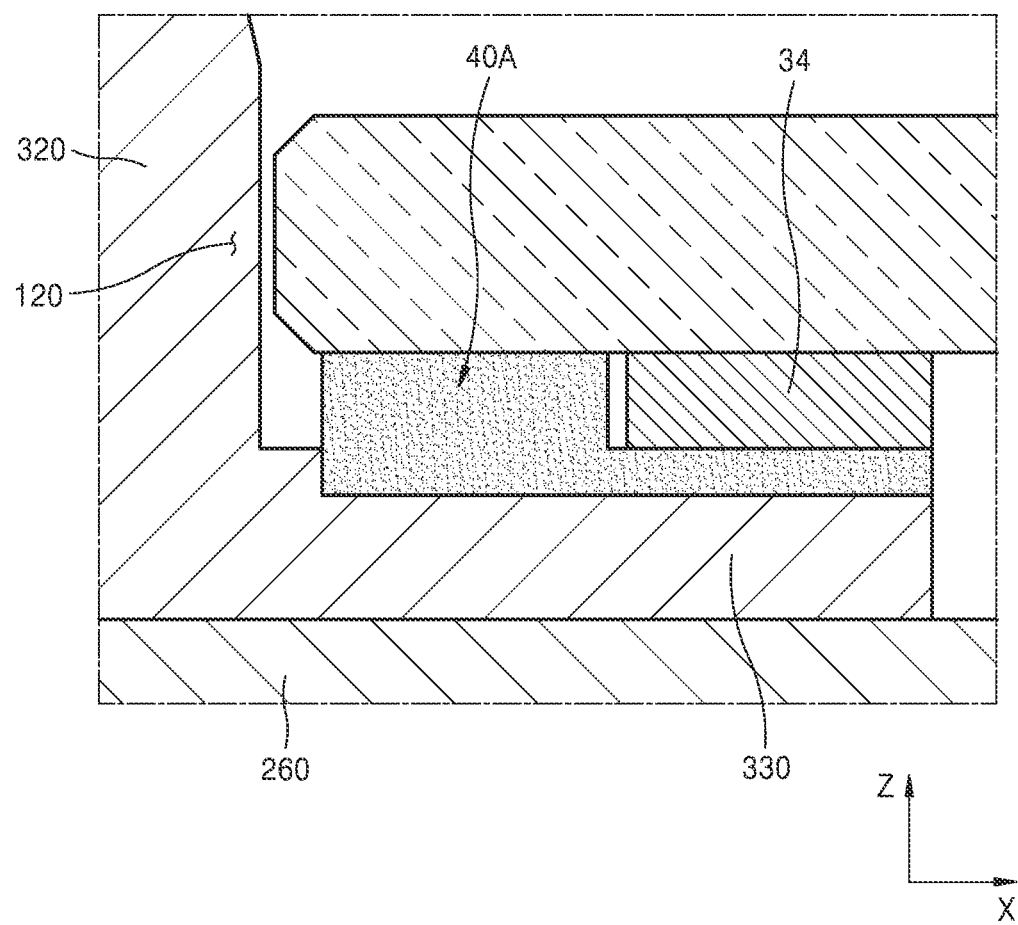
FIG. 18 is a view for describing a retention member of an electronic device, according to another embodiment.
Figure 19:
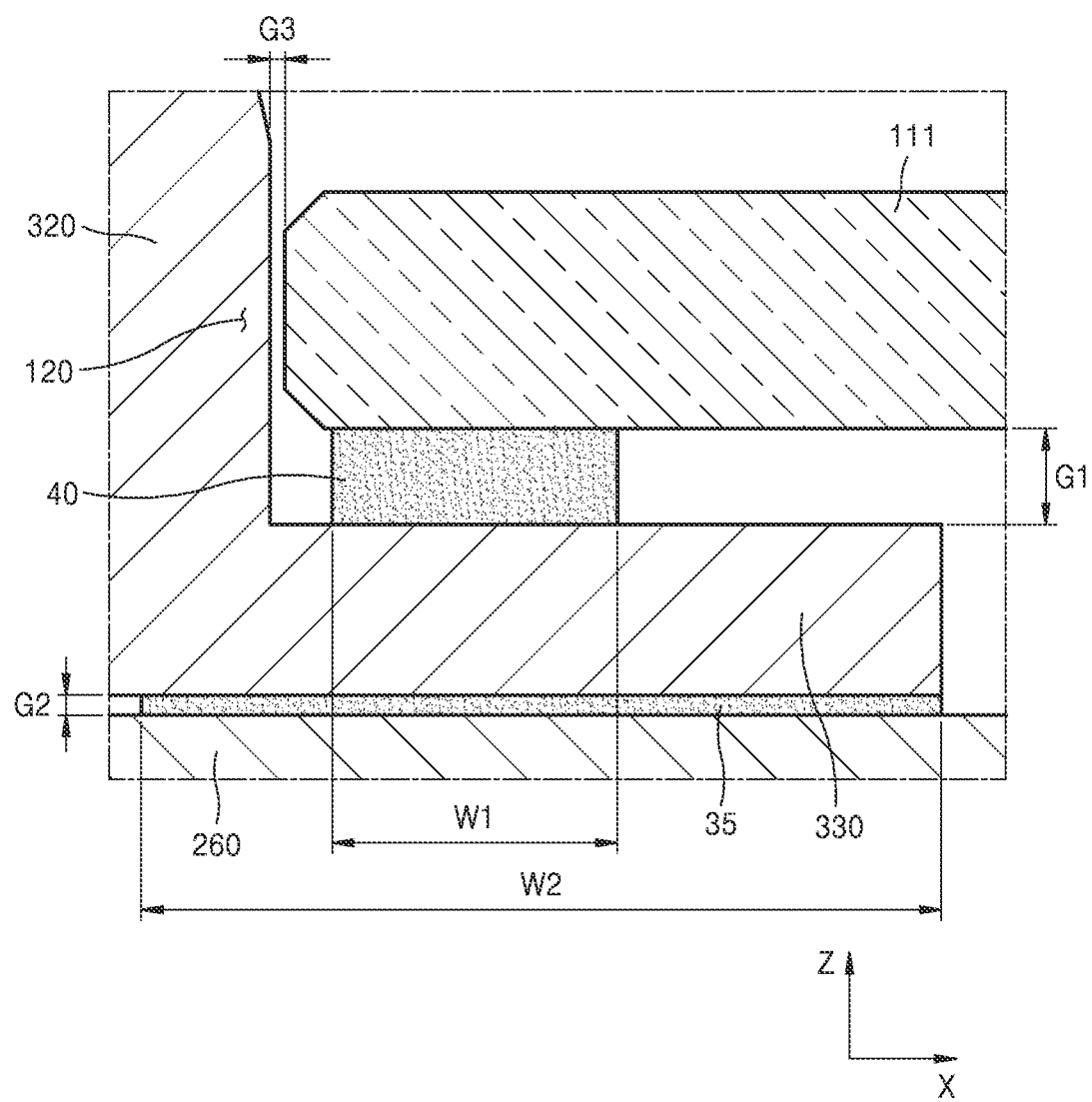
FIG. 19 is a view for describing a retention member of an electronic device, according to another embodiment.

FIGS. 16 through 18 are views for describing the retention member of the electronic device 100, according to other embodiments. Referring to FIGS. 16 through 18, the retention member may include the second adhesive member 34 and may not include the elastic member 35. The waterproof member 40 (or the waterproof member 40A) and the second adhesive member 34 may be arranged between the mounting portion 330 and the rear cover 111.

FIGS. 19 through 23 are views for describing the retention member of the electronic device 100, according to other embodiments. Referring to FIGS. 19 through 23, the retention member may include the elastic member 35 (the elastic member 35B or the elastic member 35C) and may not include the second adhesive member 34. The waterproof member 40 (the waterproof member 40A, the waterproof member 40B, or the waterproof member 40C) may be arranged between the mounting portion 330 and the rear cover 111, and the elastic member 35 (the elastic member 35B or the elastic member 35C) may be arranged between the mounting portion 330 and the housing 110.

While a description has been made of an example where the structure for mounting and waterproofing the window frame 30 is applied to the rear cover 111 arranged on the rear surface of the electronic device 100 in the foregoing embodiments, the structure may be applied to any cover having an opening formed therein, without a limitation regardless of a position.

The above-described embodiments of the disclosure are merely non-limiting examples, and those of ordinary skill in the art would appreciate that the present disclosure includes various modifications and other equivalent embodiments, in accordance with the technical spirit of the disclosure.

The invention claimed is:

1. An electronic device comprising:
a housing;
a camera module oriented in a first direction inside the housing;
a camera window arranged in front of the camera module in the first direction;
a cover including an opening into which the camera window is insertable, the cover coupled to the housing; and
a window frame supporting the camera window and mounted on the cover,
wherein the window frame comprises:
a frame body comprising a support portion arranged in the opening and supporting the camera window, and a mounting portion extending from the support portion in a second direction that is perpendicular to the first direction and overlapped by the cover in the first direction;
a retention member, comprising at least one body, retaining a first gap between the mounting portion and the cover in the first direction; and
a waterproof body configured to be elastically deformed while arranged between the mounting portion and the cover.

2. The electronic device of claim 1, wherein the at least one body of the retention member comprises an adhesive body arranged between the mounting portion and the cover and adhering the mounting portion to the cover.

3. The electronic device of claim 2, wherein the waterproof body is softer than the adhesive body.

4. The electronic device of claim 3, wherein the retention member further comprises an elastic body that is configured to provide an elastic force to the mounting portion to press the mounting portion to the cover, and
the mounting portion comprises a step into which a part of the elastic body is inserted.

5. The electronic device of claim 4, wherein the waterproof body comprises a first portion arranged between the mounting portion and the cover, and a second portion extending from the first portion and arranged between the adhesive body and the mounting portion.

6. The electronic device of claim 5, wherein the elastic body extends from the second portion and comprises a material that is the same as a material of the waterproof body.

7. The electronic device of claim 1, wherein there is a second gap between the support portion and the cover in the second direction, and
the waterproof body is arranged such as to not to be exposed through the second gap to an outside of the electronic device.

8. The electronic device of claim 1, wherein the mounting portion comprises a step into which a part of the waterproof body is inserted.

9. The electronic device of claim 4, wherein at least a part of the elastic body is overlapped by the waterproof body in the first direction.

10. The electronic device of claim 9, wherein a width of the elastic body is greater than a width of the waterproof body.

11. The electronic device of claim 2, wherein the waterproof body is arranged inside the adhesive body.

12. The electronic device of claim 1, further comprising a display arranged in the housing.

13. An electronic device comprising:
- a housing;
- an electronic module oriented in a first direction inside the housing;
- a window arranged in front of the electronic module in the first direction;
- a cover including an opening into which the window is insertable, the cover coupled to the housing; and
- a window frame supporting the window and mounted on the cover, wherein the window frame comprises:
- a frame body comprising a support portion arranged in the opening and supporting the window, and a mounting portion extending from the support portion in a second direction that is perpendicular to the first direction and overlapped by the cover in the first direction;
- an adhesive body arranged between the mounting portion and the cover and adhering the mounting portion to the cover; and
- a waterproof body configured to be elastically deformed while arranged between the mounting portion and the cover, the waterproof body being softer than the adhesive body.

14. The electronic device of claim 13, further comprising an elastic body that is configured to provide an elastic force to the mounting portion to press the mounting portion to the cover.

15. The electronic device of claim 14, wherein the waterproof body comprises a first portion arranged between the mounting portion and the cover, and a second portion extending from the first portion and arranged between the adhesive body and the mounting portion, and the elastic body extends from the second portion and comprises a material that is the same as a material of the waterproof body.

16. The electronic device of claim 15, wherein there is a second gap between the support portion and the cover in the second direction, and the waterproof body is arranged such as to not to be exposed through the second gap to an outside of the electronic device.

17. The electronic device of claim 16, wherein the mounting portion comprises a step into which a part of the waterproof body is inserted.

18. The electronic device of claim 14, wherein at least a part of the elastic body is overlapped by the waterproof body in the first direction.

19. The electronic device of claim 18, wherein a width of the elastic body is greater than a width of the waterproof body.

20. The electronic device of claim 13, wherein the waterproof body is arranged inside the adhesive body.

* * * * *